U S010659368B2

United States Patent
Quevedo

(10) Patent No.: US 10,659,368 B2
(45) Date of Patent: May 19, 2020

(54) TRANSPARENT CONTROL AND TRANSFER OF NETWORK PROTOCOLS

(71) Applicant: F5 Networks, Inc., Seattle, WA (US)

(72) Inventor: Mark Ernest Quevedo, Sammamish, WA (US)

(73) Assignee: F5 Networks, Inc., Seattle, WA (US)

(*) Notice: Subject to any disclaimer, the term of this patent is extended or adjusted under 35 U.S.C. 154(b) by 210 days.

(21) Appl. No.: 15/393,962

(22) Filed: Dec. 29, 2016

(65) Prior Publication Data

US 2017/0208008 A1 Jul. 20, 2017

Related U.S. Application Data

(60) Provisional application No. 62/274,051, filed on Dec. 31, 2015.

(51) Int. Cl.
*H04L 12/813* (2013.01)
*H04L 29/06* (2006.01)
(Continued)

(52) U.S. Cl.
CPC ............ *H04L 47/20* (2013.01); *H04L 41/24* (2013.01); *H04L 43/026* (2013.01); *H04L 43/04* (2013.01);
(Continued)

(58) Field of Classification Search
CPC ....... H04L 43/04; H04L 43/18; H04L 43/028; H04L 45/52; H04L 49/602; H04L 67/02;
(Continued)

(56) References Cited

U.S. PATENT DOCUMENTS

| 7,420,975 B1* | 9/2008 | Vasudevan | H04L 69/22 370/395.2 |
| 2009/0207750 A1* | 8/2009 | Robinson | H04L 43/18 370/252 |

(Continued)

FOREIGN PATENT DOCUMENTS

WO 2014180297 A1 11/2014

OTHER PUBLICATIONS

International Search Report and Written Opinion for International Application No. PCT/US2016/069328 dated Apr. 18, 2017, 11 pages.

(Continued)

*Primary Examiner* — Habte Mered
*Assistant Examiner* — Prince A Mensah
(74) *Attorney, Agent, or Firm* — John W. Branch; Lowe Graham Jones PLLC

(57) ABSTRACT

Embodiments are directed towards managing communication over a network with a traffic management computer (TMC). If a network protocol associated with a network traffic is unknown, additional actions may be performed. Constant value recognition actions may be selected for one or more complex protocols. The one or more complex protocols may be the Teredo protocol, or another tunneling protocol. If constant value recognition conditions may be satisfied still further actions may be performed to determine the complex protocol. If a sufficient number of the action results are affirmative, one or more operations on the network traffic may be performed based on the complex protocol. And, the network traffic may be sent to a client or a server. Performing the operations on the network traffic may include providing an identity of another network protocol that may be encapsulated in the complex protocol.

22 Claims, 11 Drawing Sheets

(51) Int. Cl.
*H04L 12/26* (2006.01)
*H04L 12/24* (2006.01)

(52) U.S. Cl.
CPC .............. *H04L 43/16* (2013.01); *H04L 69/26* (2013.01); *H04L 41/0893* (2013.01)

(58) Field of Classification Search
CPC ......... H04L 69/08; H04L 69/22; H04L 41/24; H04L 41/0893; H04L 43/16; H04L 43/026; H04L 47/20; H04L 69/26
See application file for complete search history.

(56) References Cited

U.S. PATENT DOCUMENTS

| | | | | |
|---|---|---|---|---|
| 2009/0234841 A1* | 9/2009 | Watanabe | ......... | G06F 17/30952 |
| 2010/0313195 A1 | 12/2010 | Lynn | | |
| 2012/0072607 A1* | 3/2012 | Kawashima | ............ | H04L 67/32 |
| | | | | 709/230 |
| 2012/0179796 A1* | 7/2012 | Nagaraj | .................. | H04L 45/22 |
| | | | | 709/223 |
| 2014/0269762 A1 | 9/2014 | Voit | | |
| 2014/0289401 A1 | 9/2014 | Horovitz | | |
| 2015/0019466 A1* | 1/2015 | Avidian | .................. | H04L 43/18 |
| | | | | 706/14 |
| 2015/0081726 A1* | 3/2015 | Izenberg | ............. | H04L 47/2433 |
| | | | | 707/755 |
| 2015/0350232 A1 | 12/2015 | Liu et al. | | |

OTHER PUBLICATIONS

F5 Networks, Inc., "BIG-IP Advanced Firewall Manager Operations Guide," https://support.f5.com/content/kb/en-us/products/big-ip-afm/manuals/product/f5-afm-operations-guide/_jcr_content/pdfAttach/download/file.res/f5-afm-operations-guide.pdf, Published Jul. 2016, 129 pages.

* cited by examiner

TRANSPARENT CONTROL AND TRANSFER OF NETWORK PROTOCOLS

CROSS-REFERENCE TO RELATED APPLICATIONS

This application is a Utility Patent application based on a previously filed U.S. Provisional Patent Application U.S. Ser. No. 62/274,051 filed on Dec. 31, 2015, the benefit of the filing date of which is hereby claimed under 35 U.S.C. § 119(e) and which is further incorporated by reference in its entirety.

TECHNICAL FIELD

The present innovations relate generally to network traffic management and, more particularly, but not exclusively to detecting network protocols in managed networks.

BACKGROUND

The expanded use of the Internet has increased communication connections between client devices and server devices. Often, a client device establishes a network connection with a server device by using well-known protocols, such as Transmission Control Protocol/Internet Protocol (TCP/IP), User Datagram Protocol (UDP), and the like. Sometimes there are more complex application protocols that may be wrapped in less complex protocols. In some cases, network policies may be configured for to apply to one or more complex protocols. Further, it may be difficult for a traffic management device to identify a complex network protocol. Also, in some cases, the complex protocols may be a tunneling protocol that may mask/carry another protocol. Accordingly, the management policies for the tunneling protocol may be inconsistent with the tunneled protocol. It is with respect to these considerations and others that the subject innovations have been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference will be made to the following Detailed Description of Various Embodiments, which is to be read in association with the accompanying drawings, wherein.

DETAILED DESCRIPTION OF VARIOUS EMBODIMENTS

Figure 1:
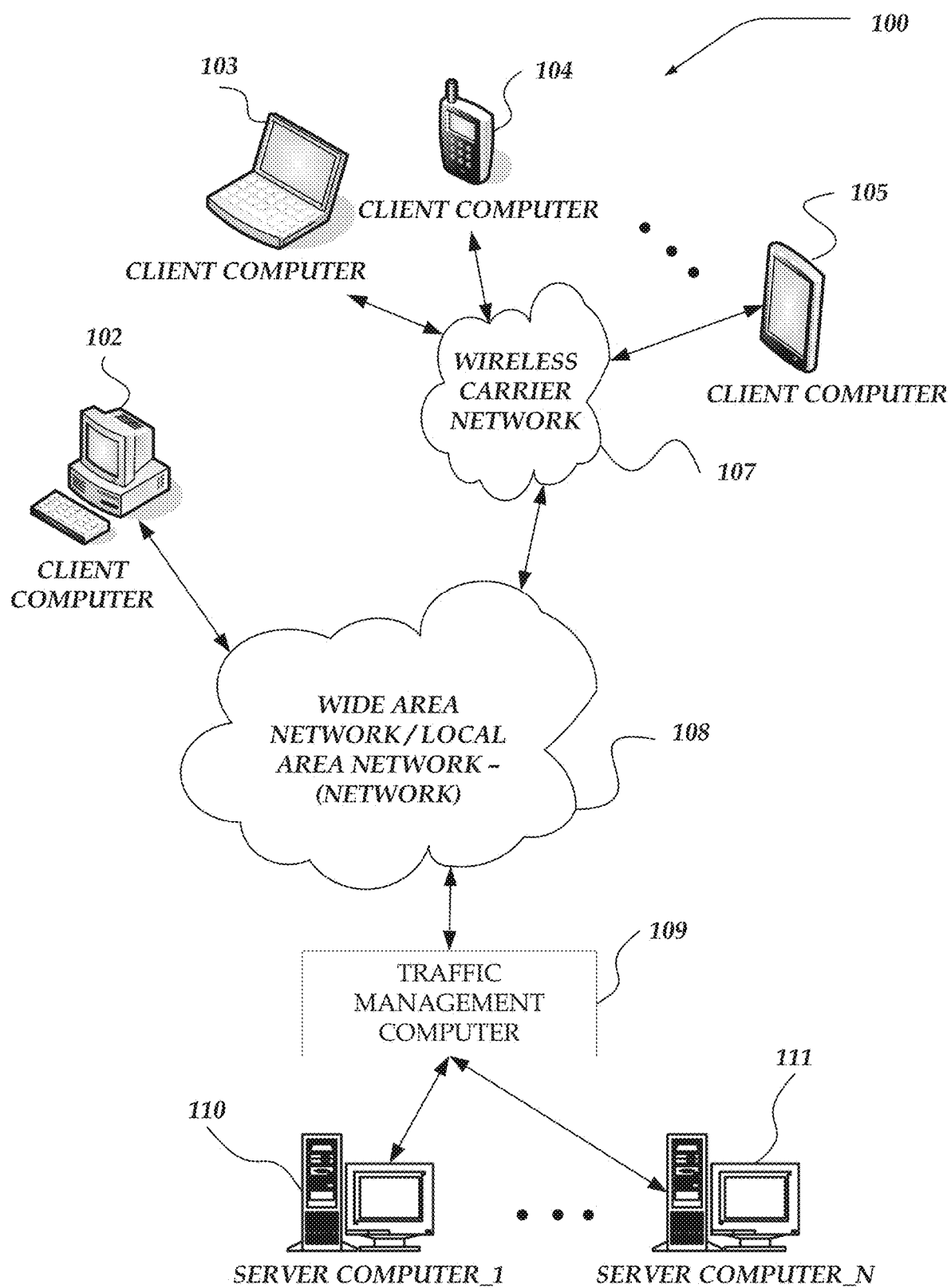
FIG. 1 is a system diagram of an environment in which embodiments of the invention may be implemented.

The present innovations now will be described more fully hereinafter with reference to the accompanying drawings, which form a part hereof, and which show, by way of illustration, specific embodiments by which these innovations may be practiced. These innovations may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present innovations may be embodied as methods, computers, or devices. Accordingly, the present innovations may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the innovations may be readily combined, without departing from the scope or spirit of the innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

As used herein the term, "engine" refers to logic embodied in hardware or software instructions, which can be written in a programming language, such as C, C++, Objective-C, COBOL, JAVA™, PHP, Perl, HTML, CSS, JavaScript, Ruby, VBScript, ASPX, Microsoft .NET™ languages such as C #, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "tuple" refers to a set of values that identify a source and destination of a connection. In one embodiment, a 5 tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. In at least one of the various embodiments, source port numbers may be a TCP source port number. Likewise, in at least one of the various embodiments, destination port number may be a TCP destination port number. In at least one of the various embodiments, tuples may be used to identify network flows (e.g., connection flows). However, a tuple need not be a 5 tuple, and other combinations of the above may also be used. For example, a tuple may be a four-tuple, using a source IP address, a destination IP address, a source port number, and a destination port number. Other combinations are also considered. Moreover, as used herein, a "flow key" refers to key that may be generated based on a tuple comprising any combination of fields selected from within a network packet header, including those fields identified above.

As used herein, the terms "network flow," "connection flow,", "flow" may refer to a network session established between two endpoints. In at least one of the various embodiments, a tuple may describe the flow. In at least one of the various embodiments, flow control data associated with connection flows may be used to ensure that the network packets sent between the endpoints of a connection flow may be routed along the same path. In at least one of the various embodiments, the performance of connection oriented network protocols such as TCP/IP may be impaired if network packets may be routed using varying paths and/or directed different endpoints. Further, one or more protocol options may be associated with a flow enabling the endpoints to employ one or more features of the protocol that may be otherwise optional.

As used herein the terms "network destination," or "network address" refer to a name or number used to identify one or more items, objects, services, and/or locations in a communication network. In some cases, the network destination and/or network address may represent a single unique endpoint on the network. In other cases, the network destination and/or network address may represent of one or more endpoints each sharing one or more similar network communication attributes and/or characteristics. In at least one of the various embodiments, the elements that comprise tuples may be considered network destinations and/or components of a network destination. Also, network destinations may be defined using one or more sub-networking masks, wildcards, matching patterns, or the like. Network communication/monitoring/metrics may be directed to one or more network destinations.

As used herein the term "network traffic" refers to data and/or information that is communicated over a network flow. This information may be arranged according to the underlying network technology (e.g., Ethernet, Token Ring, ATM, or the like). Also, the information may be further arranged based on the network protocols (e.g., Transmission Control Protocol (TCP), User Datagram Protocol (UDP), Secure Shell (SSH), File Transfer Protocol (FTP), or the like) that are being used. Network traffic is often described in terms of packets, bytes, frames, streams, channels, or the like, depending on the applications and protocols being employed.

As used herein the term "policy rule" refers to conditions and actions that may be paired together such that if a condition is met then the corresponding action may be executed. In at least one of the various embodiments, conditions may be compound conditions comprised of multiple conditions. In at least one of the various embodiments, actions may also be compound actions, or in other words, multiple actions may be associated with a condition and/or a policy rule. Policy rules may be arranged perform various network traffic management actions or operations on network traffic, such as, load balancing, network flow steering, firewalling, modifying traffic data, enforcing security, caching, compression, decompression, cryptographic operations, proxying, traffic routing, traffic switching, bandwidth shaping, quota tracking, or the like.

As used herein the term "policy" refers to a plurality of policy rules grouped together based on reasons, such as, semantic similarity, domain similarity, or the like. In at least one of the various embodiments, policy rules may be grouped into policies for any arbitrary reason to support the network management goals of a user/administrator of a traffic management computer.

As used herein the term "policy engine" refers to an engine of traffic management computer that is arranged to process policy rules. In at least one of the various embodiments, a policy engine may be arranged to execute policy rules that are expressed in one or more computer programming languages, scripts, macros, configuration settings, or the like. Thus, in at least one of the various embodiments, expressions related to conditions and actions may execute by a policy engine.

The following briefly describes the various embodiments to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

As used herein the term "constant value recognition actions," or "constant value recognizer steps" refer to actions or steps arranged for detecting a particular constant value at a particular position in a network packet such that the particular constant value may indicate that a network flow that includes the network packet might be associated with one or more network protocols. Likewise, the absence of an expected constant value may exclude one or more network protocols from being associated with the network flow. Constant value recognizer steps may be arranged to look for one or more expected values or patterns that may be located at a fixed or constant position within a network packet. One or more of the constant value recognition steps may include comparing a packet size of a network packet to a maximum packet size that corresponds to the one or more network protocols. Constant value recognition steps may be favored for use as initial recognition steps because they may be logical or arithmetic comparisons that may be performed relatively quickly.

As used herein the term "constant value recognition condition" refers to an condition that is established or tested using simple expressions, such as, logical or arithmetic comparisons, pattern matching, or the like. The data being tested may be extracted from known or fixed positions in a network packet and directly compared to one or more known values or patterns. Also, constant value recognition condition include discovery of a known pattern in a network packet where the known pattern may be found at different positions in a network packet. Constant value recognition actions may include testing for one or more constant value recognition conditions.

As used herein the term "complex network protocol," or "complex protocol" refers to network protocol that cannot be recognized using simple recognition actions such as constant value recognition steps. Complex protocols may be impossible to detect or identify using simple recognition steps such as pattern matching or constant value recognition. Accordingly, detection and confirmation of complex protocols may require intelligent processing that goes beyond pattern matching, pattern detecting, constant value matching, or the like.

As used herein the term "tunneling protocol" refers to a network protocol that contains or encapsulates other network protocols. Accordingly the payloads of tunneling protocol network packets may be include packets of another protocol. Tunneling protocols create logical tunnels using one protocol that carry another protocol inside of them. In some cases, the tunneling protocol may be arranged to provide a bridge across one or more networks. Also, tunneling protocols may enable communication using one protocol to masquerade as another protocol. For example, a tunneling protocol may use Hypertext Transfer Protocol (HTTP) to encapsulate packets of another protocol. The HTTP based tunnel may enable communication between at least two endpoints using HTTP. Then at the endpoints, the payloads of the HTTP tunnel packets may be unpacked and communicated using another network protocol that is encapsulated by the tunnel protocol packets. In some cases, the tunneling protocol may be allowed through firewalls (or the like) whereas the encapsulated protocol may be blocked. For example, most firewalls enable HTTP and HTTPS to be communicated between endpoints. Accordingly, non-HTTP/HTTPS protocols may be encapsulated inside the HTTP/HTTPS packets to pass through firewalls. This may work because to many firewalls the network traffic appears to be HTTP/HTTPS rather than another protocol which may be restricted.

Further, a tunneling protocol may obscure the encapsulated protocol it is carrying, making it harder for a traffic management computer TMC to apply the proper network policies. In some cases, connections using the tunneling protocol may be unrestricted even though the encapsulated protocol may be restricted or contain restricted content. In some cases, TMCs may be configured enforce network policies that block or restrict one or more tunneling protocols. However, in some cases, the tunneling protocols are required for normal operations. Also, in some cases, complex tunneling protocols may be complex protocols that are difficult or impossible to detect using pattern matching or constant value recognizers. Accordingly, detection and confirmation of some tunneling protocols may require intelligent processing that goes beyond pattern matching or pattern detecting. One of ordinary skill in the art will appreciate that there may be many different types of tunneling protocols that may encapsulate various protocols, including, the Teredo protocol, Anything In Anything (AYIYA), Tunnel Service Protocol (TSP), or the like.

Briefly stated, embodiments are directed towards managing communication over a network. In one or more of the various embodiments, one or more traffic management computers may be arranged to employ arithmetic operations or logical operations to identify progressively, according to rules (an algorithm) derived from an analysis of each protocol sought to be identified, which portions of the network traffic ought to be examined, to accumulate indications which lead toward meeting (or not) the threshold for protocol detection.

In one or more of the various embodiments, traffic management computer (TMC) that may be arranged such that a first processor on the one or more traffic management devices may receive network traffic. And, in at least one of the various embodiments, if a network protocol associated with the network traffic is unknown, various additional actions may be performed, by a second processor on the one or more traffic management devices. In some embodiments, one or more initial constant value recognition actions may be provided that may correspond to one or more complex protocols. In at least one of the various embodiments, the one or more complex protocols may be comprised of the Teredo protocol, or another tunneling protocol.

In at least one of the various embodiments, the one or more constant value recognition actions may include comparing a packet size of the network traffic to a maximum packet size corresponding to the one or more complex protocols. In at least one of the various embodiments, if a constant value recognition condition/criteria may be satisfied, a third processor on the one or more traffic management devices may perform additional operations, as described below.

In at least one of the various embodiments, one or more portions of data from the network traffic may be scanned such that the one or more portions of data may correspond to the one or more complex protocols. In at least one of the various embodiments, one or more values that may be based on the one or more portions of data and one or more constants defined by the one or more complex protocols may be provided. And, in at least one of the various embodiments, one or more comparisons based on the one or more values and the one or more complex protocols may be performed.

In at least one of the various embodiments, if each of the one or more comparisons is affirmative, a fourth processor on the one or more traffic management devices may perform further operations, including, performing one or more operations on the network traffic based on the one or more complex protocols; and sending, the network traffic to at least a client or a server.

In at least one of the various embodiments, performing the one or more operations on the network traffic may include providing an identity of another network protocol that may be encapsulated in the complex protocol. And, it may include, performing one or more other operations on the network traffic based on the identity of the other network protocol.

In at least one of the various embodiments, the first processor, the second processor, third processor, and the fourth processor may be the same processor. And, in at least one of the various embodiments, at least one of the first processor, the second processor, third processor, or the fourth processor may be on the same traffic management computer.

Illustrative Operating Environment

FIG. 1 shows components of one embodiment of an environment in which the invention may be practiced. Not all of the components may be required to practice these innovations, and variations in the arrangement and type of the components may be made without departing from the spirit or scope of the invention.

As shown, system 100 of FIG. 1 includes local area networks ("LANs")/wide area networks ("WANs")—(network) 108, wireless network 107, client computers 102-105, traffic management computer ("TMC") 109, and server computers 110-111. Network 108 is in communication with and enables communication between client computers 102-105, wireless network 107, and TMC 109. Wireless network 107 further enables communication with wireless devices, such as client computers 103-105. TMC 109 is in communication with network 108 and server computers 110-111.

One embodiment of client computers 102-105 is described in more detail below in conjunction with FIG. 2. In one embodiment, at least some of client computers 102-105 may operate over wired and/or a wireless networks, such as networks 107 and/or 108. Generally, client computers 102-105 may include virtually any computing device, or computer capable of communicating over a network. It should be recognized that more or less client computers may be included within a system such as described herein, and embodiments are therefore not constrained by the number or type of client computers employed.

Computers that may operate as client computers may include computers that typically connect using a wired or wireless communications medium, such as personal computers, servers, multiprocessor systems, microprocessor-based or programmable consumer electronics, network PCs, or the like. In some embodiments, client computers 102-105 may include virtually any portable computing computer, or computer, capable of connecting to another computing device, or computer and communicating information, such as laptop computers, smart phones, mobile computers, tablet computers, or the like. However, client computers are not so limited and may also include other portable devices, such as cellular telephones, display pagers, radio frequency ("RF") devices, infrared ("IR") devices, Personal Digital Assistants ("PDAs"), wearable computers, integrated devices combining one or more of the preceding devices, and the like. As such, client computers 102-105 typically range widely in terms of capabilities and features. Moreover, client computers 102-105 may provide access to various computing applications, including a browser, or other web-based applications.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client computer may employ the browser application to perform various activities over a network (online). However, another application resident on the client computer may also be used to perform various online activities.

Client computers 102-105 also may include at least one other client application that is configured to communicate by receiving and/or sending data with one or more other computing devices and/or computers. The client application may include a capability to send and/or receive content, or the like. The client application may further provide information that identifies itself, including a type, capability, name, or the like. In one embodiment, client computers 102-105 may uniquely identify themselves through any of a variety of mechanisms, including a phone number, network address, MAC address, Mobile Identification Number ("MIN"), an electronic serial number ("ESN"), or other mobile device identifier. The information may also indicate a content format that the client computer is enabled to employ. Such information may be provided in a network packet, or the like, sent between other client computers, TMC 109, server computers 110-111, or other computing devices.

Client computers 102-105 may further be configured to include a client application that enables an end-user to log into an end-user account that may be managed by another computer, such as server computers 110-111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless network 107 is configured to couple client computers 103-105 and its components with network 108. Wireless network 107 may include any of a variety of wireless sub-networks that may further overlay stand-alone ad-hoc networks, and the like, to provide an infrastructure-oriented connection for client computers 102-105. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) $5^{th}$ (5G) generation radio access for cellular systems, WLAN, Wireless Router ("WR") mesh, and the like. Access technologies such as 2G, 3G, 4G, 5G, and future access networks may enable wide area coverage for mobile computers, such as client computers 103-105 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, wireless network 107 may include virtually any wireless communication mechanism by which information may travel between client computers 103-105 and another computing device, computer, network, and the like.

Network 108 is configured to couple network computers with other computing devices, and/or computers, including, server computers 110-111 through TMC109, client computer 102, and client computers 103-105 through wireless network 107. Network 108 is enabled to employ any form of computer readable media for communicating information from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices and/or computers.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of TMC 109 is described in more detail below in conjunction with FIG. 3. Briefly, however, TMC 109 may include virtually any network computer capable of managing network traffic between client computers 102-105 and server computers 110-111. Such computers include, for example, routers, proxies, firewalls, load balancers, cache devices, devices that perform network address translation, or the like, or any combination thereof. TMC 109 may perform the operations of routing, translating, switching packets, network address translation, firewall services, network flow control, or the like. In one embodiment, TMC 109 may inspect incoming network packets, and may perform an address translation, port translation, a packet sequence translation, firewall operations, and the like, and route the network packets based, at least in part, on the packet inspection. In some embodiments, TMC 109 may perform load balancing operations to determine a server computer to direct a request. Such load balancing operations may be based on network traffic, network topology, capacity of a server, content requested, or other traffic distribution mechanisms.

TMC 109 may be arranged to perform hardware-optimized operations that perform statistics gathering, per-packet policy enforcement (e.g., packet address translations), high-speed flow caches, or the like, on managed connection flows between client computers, such as client computers 102-105, and server computers, such as server computers 110-111.

Server computers 110-111 may include virtually any network computer that may operate as a website server. However, server computers 110-111 are not limited to website servers, and may also operate as messaging server, a File Transfer Protocol (FTP) server, a database server, content server, application server, or the like. Additionally, each of server computers 110-111 may be configured to perform a different operation. Computers that may operate as server computers 110-111 include various network computers, including, but not limited to personal computers, desktop computers, multiprocessor systems, microprocessor-based or programmable consumer electronics, network PCs, server computers, network appliances, and the like.

Although FIG. 1 illustrates server computers 110-111 as single computers, the invention is not so limited. For example, one or more functions of each of server computers 110-111 may be distributed across one or more distinct network computers. Moreover, server computers 110-111 are not limited to a particular configuration. Thus, in one embodiment, server computers 110-111 may contain a plurality of network computers that operate using a master/slave approach, where one of the plurality of network computers of server computers 110-111 operate to manage and/or otherwise coordinate operations of the other network computers. In other embodiments, the server computers 110-111 may operate as a plurality of network computers within a cluster architecture, a peer-to-peer architecture, a cloud architecture, or the like. Thus, the invention is not to be construed as being limited to a single environment, and other configurations, and architectures are also envisaged. Likewise, TMC 109 may be comprised of a hypervisor and one or more virtual machines that may perform network management operations.

Illustrative Client Computer

Figure 2:
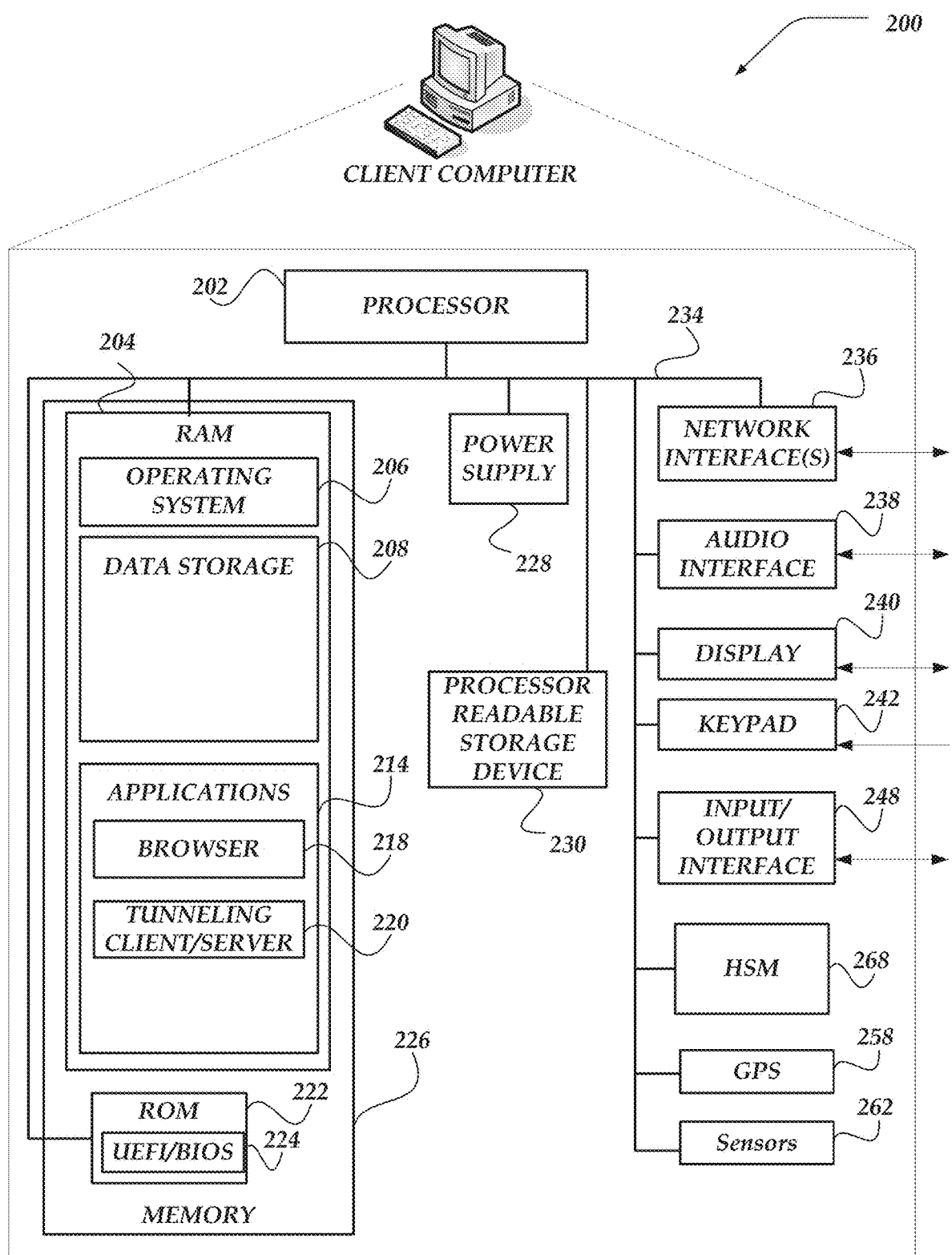
FIG. 2 shows an embodiment of a client computer that may be included in a system such as that shown in FIG. 1.

FIG. 2 shows one embodiment of client computer 200 that may be included in a system implementing embodiments of the invention. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes one or more processors, such as processor 202 in communication with memory 226 via a bus 234. Each of the one or more processors may include one or more cores. Client computer 200 also includes a power supply 228, one or more network interfaces 236, an audio interface 238, a display 240, a keypad 242, input/output interface 248, HSM 268, GPS 258, and sensors 262.

Power supply 228 provides power to client computer 200. A rechargeable or non-rechargeable battery may be used to provide power. The power may also be provided by an external power source, such as an AC adapter or a powered docking cradle that supplements and/or recharges a battery.

Client computer 200 may optionally communicate with a base station (not shown), or directly with another computing device and/or computer. Network interface 236 includes circuitry for coupling client computer 200 to one or more networks, and is constructed for use with one or more communication protocols and technologies including, but not limited to, global system for mobile communication ("GSM"), code division multiple access ("CDMA"), time division multiple access ("TDMA"), High Speed Downlink Packet Access ("HSDPA"), Long Term Evolution ("LTE"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), or any other type of display used with a computing device and/or computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200.

Memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("UEFI/BIOS") 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Windows Mobile™, or the IOS® operating system.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another device or computer based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. At least a portion of the information may also be stored on another component of network computer 200, including, but not limited to processor readable storage device 230, a disk drive or other computer readable storage medias (not shown) within client computer 200.

Processor readable storage device 230 may include volatile, nonvolatile, removable, non-transitory, or non-removable media implemented in any method or technology for storage of information, such as computer or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, USB thumb drives, magnetic cassettes, magnetic tape, magnetic disk storage or other magnetic storage devices, or any other physical medium which can be used to store the desired information and which can be accessed by a computing device and/or computer. Processor readable storage device 230 may also be referred to herein as computer readable storage media.

Applications 214 may include computer executable instructions which, when executed by client computer 200, transmit, receive, and/or otherwise process network data. Network data may include, but is not limited to, messages (e.g., SMS, Multimedia Message Service ("MMS"), instant message ("IM"), email, and/or other messages), audio, video, and enable telecommunication with another user of another client computer. Applications 214 may include, for example, browser 218. Applications 214 may include other applications, which may include, but are not limited to, calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as TMC 109 and/or indirectly with server computers 110-111. Tunneling client/server application 220 may enable one or more tunneling protocols for communicating to one or more endpoint computers over a network tunneling protocol.

In at least one of the various embodiments, applications, such as, web browser 218, tunneling client/server application 220, other applications, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 258. Also, in some embodiments, geolocation information may include information providing using one or more geolocation protocols over the networks, such as, wireless network 108 and/or network 111.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the network computer may include one or more hardware microcontrollers instead of one or more CPUs. In at least one embodiment, the one or more microcontrollers may directly execute their own embedded logic to perform actions and access their own internal memory and their own external Input and Output Interfaces (e.g., hardware pins and/or wireless transceivers) to perform as a System On a Chip (SOC), or the like.

Illustrative Network Computer

Figure 3:
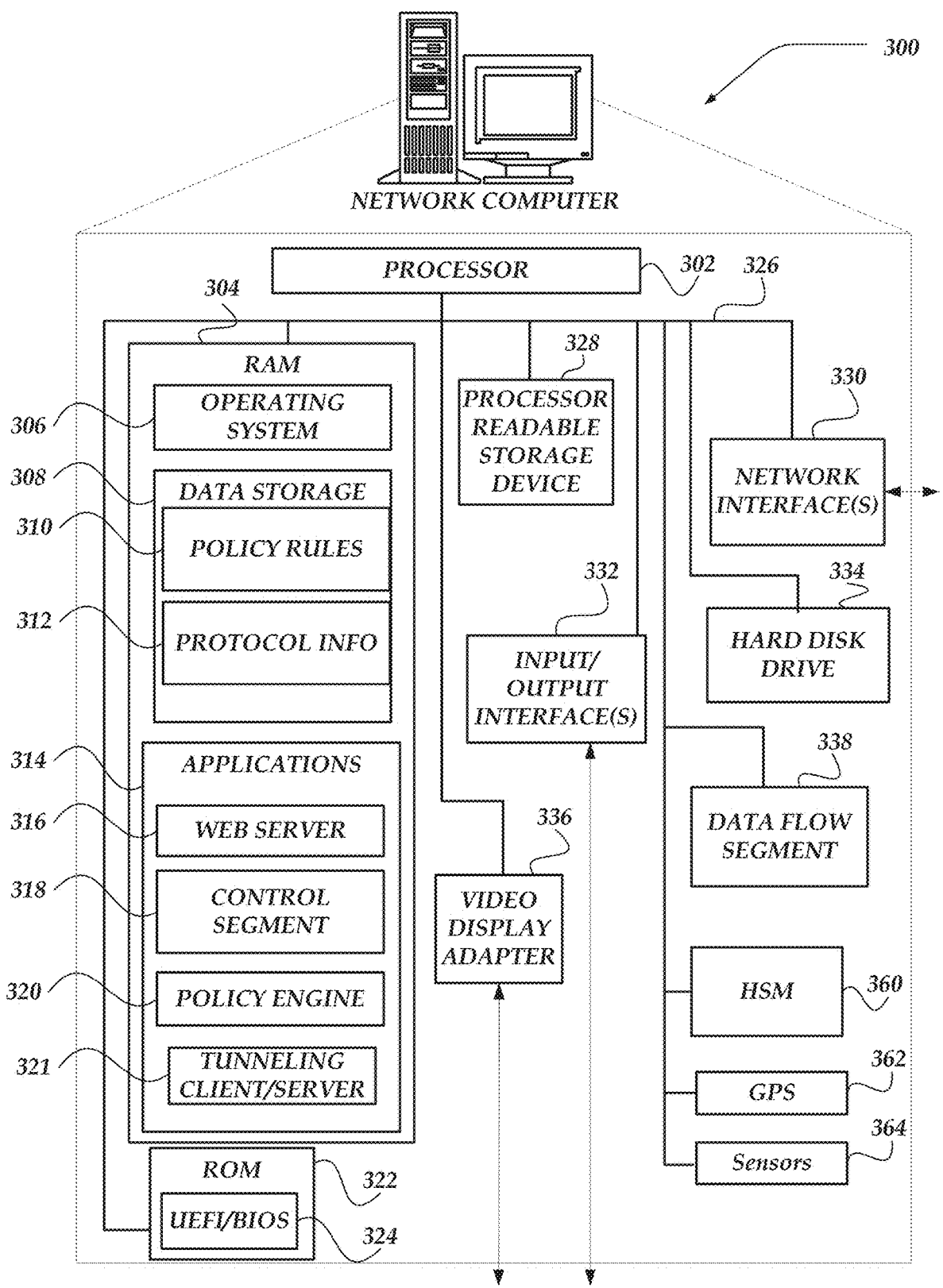
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, or any other computer. Network computer 300 may represent, for example TMC 109 of FIG. 1, server computers 110-111 of FIG. 1, and/or other network computers.

Network computer 300 includes one or more processors, such as, processor 302, processor readable storage device 328, network interface unit 330, an input/output interface 332, hard disk drive 334, video display adapter 336, data flow segment (DFS) 338, hardware security module (HSM) 360, global positioning system (GPS) 362, sensors 364, and a mass memory, all in communication with each other via bus 326. In some embodiments, the processors may be comprised of one or more cores. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network computer 300. Any general-purpose operating system may be employed. Unified Extensible Firmware Interface or basic input/output system (UEFI/BIOS) 324 is also provided for controlling the low-level operation of network computer 300. As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer readable media, namely computer readable storage media and/or processor readable storage media, including processor readable storage device 328. Processor readable storage device 328 may include volatile, nonvolatile, non-transitory, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device and/or computer.

Data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit 302 to execute and perform actions. Also, in at least one of the various embodiments, data storage 308 may include data, such as, one or more flow traffic buffers, policy rules 310 for determining if some or all of the management actions applied to network flows, protocol information 312 for identifying protocols, or the like. In one embodiment, at least some of data store 308 might also be stored on another component of network computer 300, including, but not limited to processor-readable storage device 328, hard disk drive 334, or the like.

The mass memory may also store program code and data. One or more applications 314 may be loaded into mass memory and run on operating system 306. Examples of application programs may include transcoders, schedulers, calendars, database programs, word processing programs, Hypertext Transfer Protocol (HTTP) programs, customizable user interface programs, IPSEC applications, encryption programs, security programs, SMS message servers, IM message servers, email servers, account managers, and so forth. Web server 316, control segment (CS) 318, and policy engine 320, tunneling client/server application 321 may also be included as application programs within applications 314.

Web server 316 represents any of a variety of services that are configured to provide content, including messages, over a network to another computing device and/or computer. Thus, web server 316 includes, for example, a web server, a File Transfer Protocol (FTP) server, a database server, a content server, or the like. Web server 316 may provide the content including messages over the network using any of a variety of formats including, but not limited to WAP, HDML, WML, SGML, HTML, XML, Extensible HTML (xHTML), or the like. Web server 316 may also be configured to enable a user of a client computer, such as client computers 102-105 of FIG. 1, to browse websites, upload user data, or the like.

Network computer 300 may also include DFS 338 for maintaining connection flows between client computers, such as client computers 102-105 of FIG. 1, and server computers, such as server computers 110-111 of FIG. 1. In one embodiment, DFS 338 may include hardware-optimized operations for packet traffic management, such as repetitive operations associated with packet traffic management. For example, DFS 338 may perform statistics gathering, per-packet policy enforcement (e.g., packet address translations), or the like, on connection flows maintained at DFS 338. In some embodiments, DFS 338 may route, switch, forward, and/or otherwise direct packets based on policy rules for a particular connection flow signature (e.g., a 5 tuple of a received packet). Thus, DFS 338 may include capabilities and perform tasks such as that of a router, a switch, a routing switch, firewalls, network address translation, or the like. In at least one of the various embodiments, components of DFS 338 may comprise and/or work in combination to provide high-speed flow caches for optimizing packet traffic management.

In at least one of the various embodiments, policy engine 320 may be arranged for executing one or more network traffic management policies for network traffic managed by the TMC. Policy engine 320 may be arranged to include policy information that may be used to determine if a policy may be applicable to a network flow. Accordingly, policy engine 320 may monitor one or more network flows for determining which policy may apply to the network flow based on rules included in policy rules 310. In at least one of the various embodiments, policy engine 320 may execute one or more policy rules for determining if reset/termination message send rate limits may be modified for a given TMC. Tunneling client/server application 321 may enable one or more tunneling protocols for communicating to one or more endpoint computers over a network tunneling protocol.

In at least one of the various embodiments, applications, such as, webserver 316, control segment 318, policy engine 320, or tunneling client/server application 321, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 362. Also, in some embodiments, geolocation information may include information providing using one or more geo-location protocols over the networks, such as, wireless network 108 and/or network 111.

Furthermore, in at least one of the various embodiments, webserver 316, control segment 318, policy engine 320, or tunneling client/server application 321, may be operative in a cloud-based computing environment. In at least one of the various embodiments, these applications, and others, that comprise the management platform may be executing within virtual machines and/or virtual servers that may be managed in a cloud-based based computing environment. Also, in at least one of the various embodiments, webserver 316, control segment 318, policy engine 320, or tunneling client/ server application 321, or the like, may located in one or more virtual servers running in a cloud-based computing environment rather than being tied to one or more specific physical network computer.

Also, in at least one of the various embodiments, webserver 316, control segment 318, policy engine 320, or tunneling client/server application 321, or the like may be running in one or more virtual machines (VM's) executing on network computer 300. In at least one of the various embodiments, virtual machines running on network computer 300 may be managed and/or supervised by a hypervisor.

Additionally, in one or more embodiments (not shown in the figures), network computer 300 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute their embedded logic to perform actions. Also, in one or more embodiments (not shown in the figures), the network computer may include one or more hardware microcontrollers instead of one or more CPUs. In at least one embodiment, the microcontrollers may directly execute their own embedded logic to perform actions and access their own internal memory and their own external Input and Output Interfaces (e.g., hardware pins and/or wireless transceivers) to perform as a System On a Chip (SOC), or the like.

Illustrative Logical Architecture

Figure 4A:
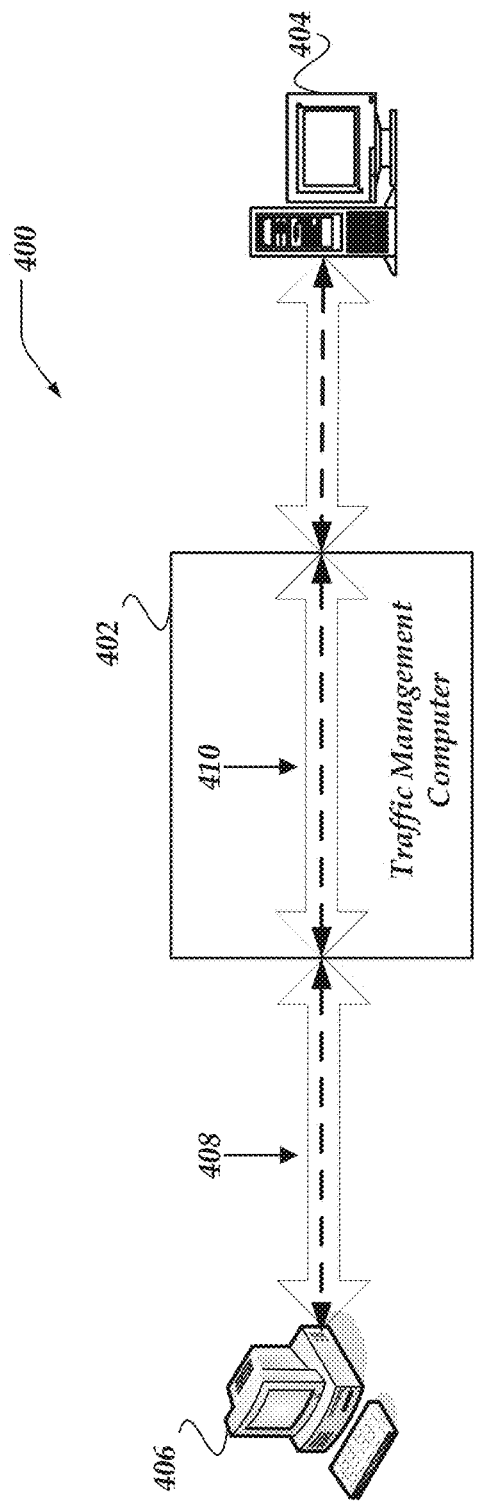
FIG. 4A illustrates a logical system diagram generally showing one embodiment of a system for transparent control and transfer of network protocols.

FIG. 4A illustrates a logical system diagram generally showing one embodiment of a system for transparent control and transfer of network protocols. System 400A may include traffic management computer (TMC) 402 disposed between computer 406 and computer 404. Computer 404-406 may include be one or more client computers, such as client computers 200 of FIG. 2 or one or more network computers, such as network computer 300 of FIG. 3.

In at least one of the various embodiments, computer 404 may attempt to communicate to computer 404 using a tunneling protocol. In this example, TMC 402 is acting as a firewall disposed between the two computers. Accordingly, TMC 402 may be arranged to intercept and/or monitor the network traffic between computer 402 and computer 404. In some embodiments, TMC 402 may be arranged to monitor both directions of communications. In such embodiments, the TMC 109 may monitor outbound network traffic as well as inbound network traffic.

In at least one of the various embodiments, tunneling protocols may be network communication protocols that contain payloads that may be packets using another protocol. Tunneling protocols may create a logical tunnel using one protocol that carries another protocol inside of it. In some cases, the tunneling protocol may be arranged to provide a bridge across one or more networks. Also, in some embodiments, tunneling protocols may enable communication using one protocol to masquerade as another protocol. For example, a tunneling protocol may use the HTTP protocol to encapsulate packets of another protocol. The HTTP tunnel may enable communication between at least two endpoints, at the endpoints, the payload of the HTTP tunnel may be unpacked and communicated using another protocol for the payload. In some cases, the tunneling protocol may be allowed through firewalls (or the like) whereas the encapsulated protocol may be blocked. For example, most firewalls enable HTTP and HTTPS to be communicated between endpoints. Accordingly, non-HTTP/

HTTPS protocols may be encapsulated inside the HTTP/HTTPS packets. Thus, to the naïve firewall, the communication appears to be HTTP/HTTPS communication (which is allowed) rather than another protocol which may be restricted.

In this example, computer 406 may be establishing communication 408 to TMC 402 using a tunneling protocol that has encapsulated another protocol. In at least one of the various embodiments, TMC 402 may monitor and/or inspect the communication (communication 410) and apply policies including allowing/enabling the tunneled communication to continue to its destination, computer 404. In at least one of the various embodiments, since TMC 402 is disposed between the endpoints (computer 406 and computer 404, it is enabled to inspect the contents of the tunneling protocol communication.

In one or more of the various embodiments, one or more traffic management computers may be arranged to employ arithmetic operations or logical operations to identify progressively, according to rules (an algorithm) derived from an analysis of each protocol sought to be identified, which portions of the network traffic ought to be examined, to accumulate indications which lead toward meeting (or not) the threshold for protocol detection.

Accordingly, in at least one of the various embodiments, the TMC 402 may be enabled to inspect the contents of the encapsulated communications. Accordingly, further network policies or policy rules may be applied to the communication based on the contents of the encapsulated communication. For example, there may be certain network policies that may be applied to connections using HTTP as a tunneling protocol. And, there may be additional network policies to apply based on the protocol that is encapsulated by the tunneling protocol.

In at least one of the various embodiments, the tunneling protocol may obscure the protocol it is carrying, making it harder for the TMC to apply the correct network policies. In some cases, connections using the tunneling protocol may be unrestricted even though the encapsulated protocol may be restricted or contain restricted content. Accordingly, TMC 402 may be arranged to identify if connections are using a tunneling protocol and inspect the contents that are being tunneled.

In at least one of the various embodiments, a TMC may be configured to block or restrict one or more tunneling protocols. However, in some cases, the tunneling protocols are required for normal operations. Also, in some cases, the tunneling protocols may be complex and difficult to detect using pattern matching. Accordingly, detection and confirmation of some tunneling protocols may require intelligent processing that goes beyond pattern matching/pattern detecting.

In at least one of the various embodiments, TMC 402 may be arranged to provide multi-stage detection processes for detecting connections that are using complex protocols, including complex tunneling protocols or other difficult to detect protocols. TMC 402 may be arranged to identify connection flows using the tuple information that is associated with a given connection flow. Accordingly, in at least one of the various embodiments, if a connection flow is identified as using a complex protocol, it may be tagged as such so the detection process may be required to run just once per connection flow. Network traffic that is associated with the identified flow may be identified based on the tuple information included in its associated network packets.

Figure 4B:
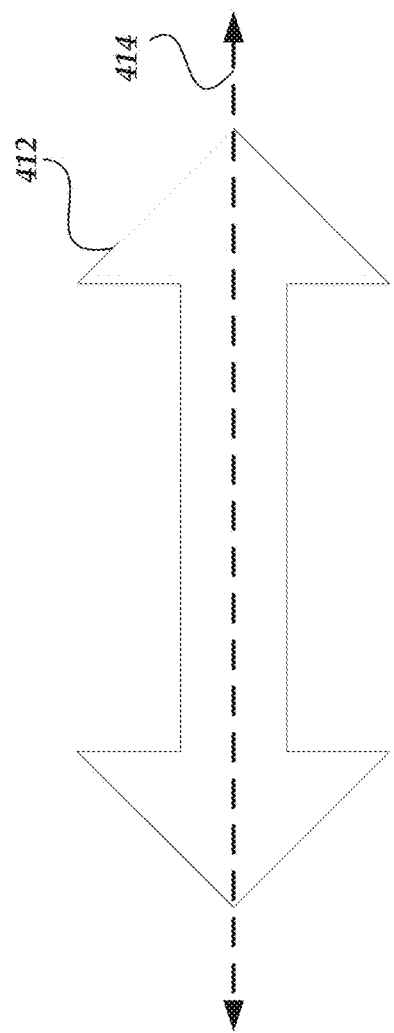
FIG. 4B illustrates a logical system diagram generally showing one embodiment of a tunneling network protocol.

FIG. 4B illustrates a logical system diagram generally showing one embodiment of a tunneling network protocol.

In this example, tunneling protocol 412 is shown as encapsulating network protocol 414. For brevity and clarity, the particular details of how a given tunnel is established between endpoints for a particular tunneling protocol are omitted because for a given protocol this information will be well-known to one of ordinary skill in the art. Also, one of ordinary skill in the art will appreciate that there may be many different types of tunneling protocols and encapsulated protocols. Below the Teredo protocol may be discussed in some examples, however, the innovations described herein apply to other tunneling protocol as well as other complex protocols. For example, tunneling protocols such as, anything in anything (AYIYA), tunnel service protocol (TSP), or the like, may require intelligent detection processes similar to those described for the Teredo protocol.

Generalized Operation

The operation of certain aspects of the invention will now be described with respect to FIGS. 5-9. In at least one of various embodiments, processes 500, 600, 700, 800, and 900 described in conjunction with FIGS. 5-9, respectively, may be implemented by and/or executed on a computer, such as, client computer 200, network computer 300, or the like. In other embodiments, these processes or portions of these processes may be implemented by and/or executed on a plurality of network computers or traffic management computers, such as network computer 300 of FIG. 3. Further, in other embodiments, these processes or portions of these processes may be implemented by and/or executed on one or more client computers, such as client computer 200 as shown in FIG. 2. However, embodiments are not so limited and various combinations of network computers, or the like, may be utilized.

Figure 5:
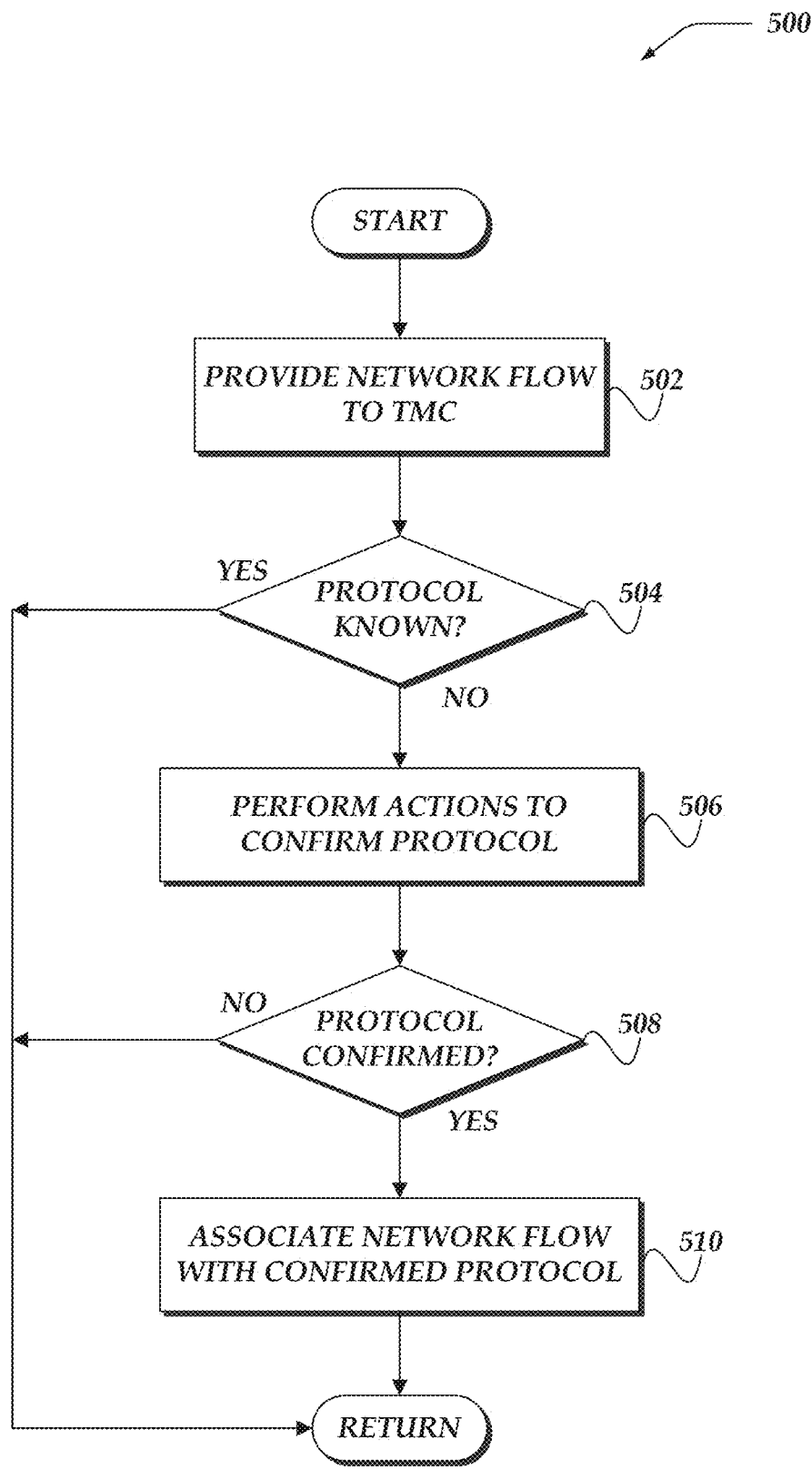
FIG. 5 shows an overview flowchart for a process for transparent control and transfer of network protocols in accordance with at least one of the various embodiments.

FIG. 5 shows an overview flowchart for process 500 for transparent control and transfer of network protocols in accordance with at least one of the various embodiments. After a start block, at block 502, in at least one of the various embodiments, a network flow may be provided to a TMC. In at least one of the various embodiments, network flows are network connections that may be associated with a particular tuple. In at least one of the various embodiments, the network flow may be provided over network and may be from a computer endpoint.

In at least one of the various embodiments, the network flow may be communicated over an external network, such as, from a computer connected over the internet, or other publically accessible wide-area network. Also, in at least one of the various embodiments, the network flow may be communicated from a computer that may be on an internal and/or private network.

In at least one of the various embodiments, the TMC may be arranged to use applications, such as, control segment 318, policy engine 320, or the like, and/or DFS 338 to determine characteristics of the network flow and attempt to identify the protocol being used.

At decision block 504, in at least one of the various embodiments, if the network protocol for the provided network flow is confirmed, control may be returned to a calling process. In at least one of the various embodiments, if the protocol for the network flow is already known, the TMC may pass the flow on and continue other processing. In at least one of the various embodiments, the TMC may maintain a lookup table to store the protocol information that is associated with each network flow. In at least one of the various embodiments, the network flow may be identified by its associated tuple values. Accordingly, in at least one of the various embodiments, the TMC may lookup up the flow information using the tuple information to confirm if the protocol is known/confirmed.

At block 506, in at least one of the various embodiments, the TMC may perform various actions to attempt to identify the protocol that is associated with the network flow. In at least one of the various embodiments, one or more state machines and/or programs may be used to try and identify and/or confirm the network protocol. In some embodiments, a portion of these actions may be performed using a DFS, such as, DFS 338. In some embodiments, other portions of these actions may be performed by CS 318, policy engine 320, or the like.

At decision block 508, in at least one of the various embodiments, if the network protocol for the network flow is confirmed, control may flow to block 510; otherwise, control may be returned to a calling process. In at least one of the various embodiments, there is no guarantee that the protocol for the network flow will be confirmed beyond the question of whether it is using UDP, TCP/IP, or the like. Also, if the protocol is unconfirmed it may indicate that the TMC is not configured to identify the particular protocol. At block 510, in at least one of the various embodiments, since the protocol used by the network flow is confirmed, the protocol type may be associated with the tuple information of the network flow and stored in a lookup table and/or lookup cache. Next, control may be returned to a calling process.

Figure 6:
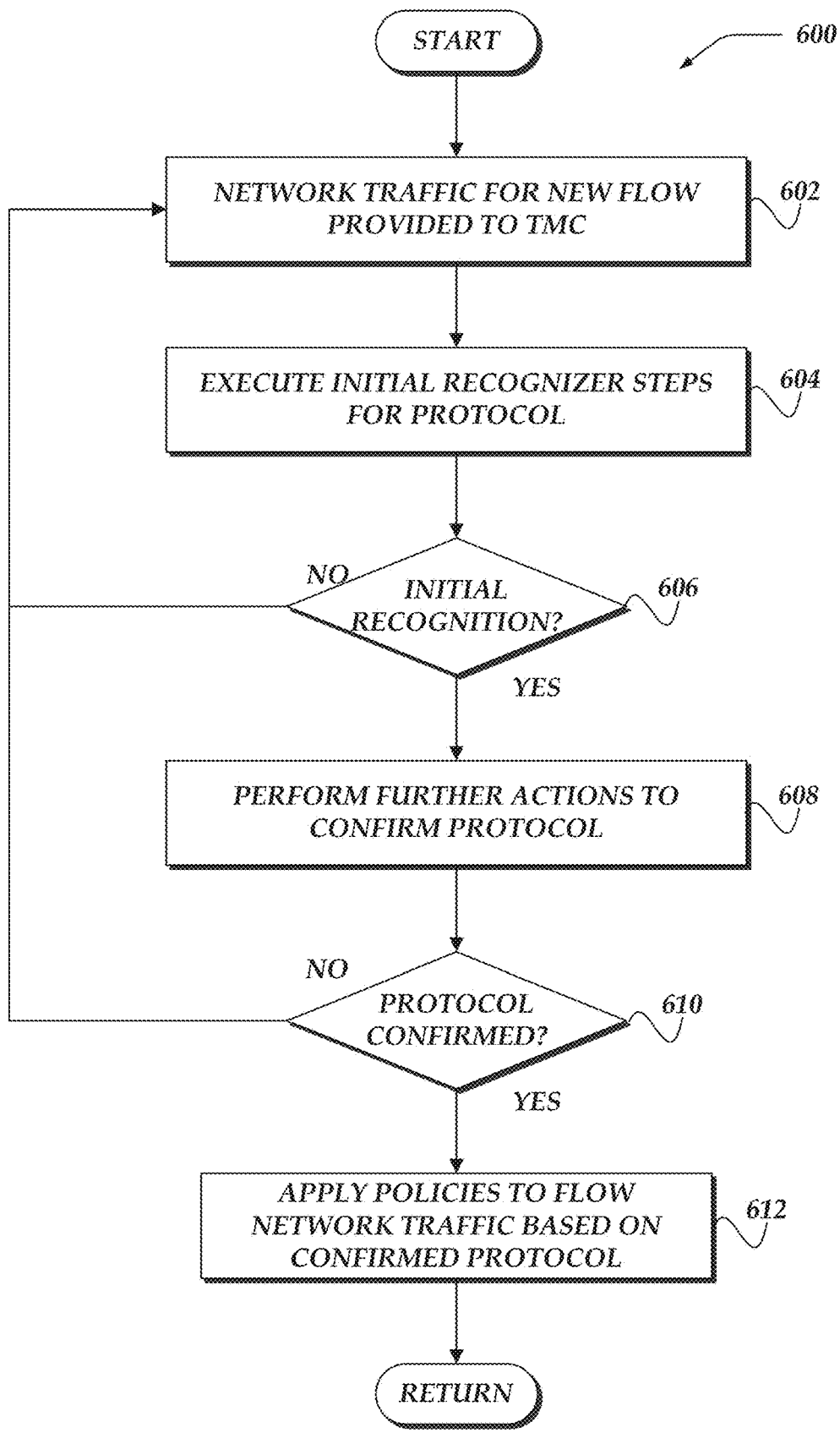
FIG. 6 shows an overview flowchart for a process for transparent control and transfer of network protocols in accordance with at least one of the various embodiments.

FIG. 6 shows an overview flowchart for process 600 for transparent control and transfer of network protocols in accordance with at least one of the various embodiments. After a start block, at block 602, in at least one of the various embodiments, network traffic for a network flow may be provided to the TMC. In some embodiments, the network traffic may be one or more network packets of the flow. For example, if the flow is a UDP flow, the network traffic may be one or more UDP packets that may be implementing a heretofore unknown/unconfirmed network protocol. In at least one of the various embodiments, the TMC may be arranged to buffer one or more network packets, including buffering a number of packets previous to the network traffic currently being processed as well as one or more network packets subsequent to the network traffic being processed. Accordingly, the TMC may have access to network traffic that came before the current packet that is being analyzed. Likewise, in some embodiments, the TMC may have access to a portion network traffic that comes after the packet currently being analyzed. In one or more of the various embodiments, the amount of buffering (e.g., buffer size) may be defined using configuration information.

At block 604, in at least one of the various embodiments, the TMC may be arranged to perform an initial analysis to try to determine if there are indicators in the packets that may enable the protocol to be determined.

In at least one of the various embodiments, a single string at a known position may indicate that there is a possibility that the network flow may be using one or more of the protocols that the TMC may be configured to detect. In at least one of the various embodiments, some or all of the initial recognizer steps may be performed by a hardware DFS, such as, DFS 338.

In at least one of the various embodiments, one or more initial recognizer steps may be associated with one or more different protocols. For example, detecting a particular value at a particular position in a packet may indicate that the flow might be associated with three protocols. Accordingly, additional analysis may be performed to confirm which of the three protocols may be associated with the flow (if any). In some embodiments, one or more of the initial recognizer steps may look for one or more expected values or patterns that may be located at a fixed or constant position within a network packet that may be under analysis. In some embodiments, such recognizer steps may be referred to as constant value recognizer steps.

In at least one of the various embodiments, there may be more than one set of recognizer steps each testing for one or more different protocols. Accordingly, in at least one of the various embodiments, the TMC may be arranged to apply each of the different sets of recognizer steps to the packet under analysis until each set is exhausted or an initial recognition is made.

In at least one of the various embodiments, in high speed performance implementations, the DFS, or other hardware components (e.g., FPGAs, ASICs, or the like) may be arranged to include one or more tables of pointers to the different initial and/or constant value recognizers steps (custom programs). The pointers may point to compiled executable programs that are loaded into a hardware cache memory that may be accessible by the DFS. Accordingly, the DFS may be arranged to execute one or more of the different programs to try to determine an initial recognition (a triggering step) for determining a protocol.

Also, in at least one of the various embodiments, the TMC may be arranged to enable an application, such as, control segment 318, policy engine 320, or the like, to load the initial recognizer program and their pointers into the DFS or other hardware components (e.g., FPGAs, ASICs, or the like). Accordingly, in at least one of the various embodiments, the TMC may be arranged to employ configuration information to determine which initial recognizers should be loaded onto the DFS (if any) as well as which ones should be executable by software engines such as control segment 318.

At decision block 606, in at least one of the various embodiments, if the initial recognizer steps have determined that the network flow might be a protocol of interest, control may flow to block 608; otherwise, control may loop back to block 602. In at least one of the various embodiments, if the initial constant value recognizer steps do not indicate that the network might be associated with a protocol of interest, process 600 may ignore the flow. In some circumstance, an initial recognizer step may be a simple pattern match that indicates that further analysis must be done to confirm the protocol. Likewise, in at least one of the various embodiments, the constant value recognizer steps may exclude one or more protocols from consideration. For example, if the packet's payload size is less than 48 bytes, the Teredo protocol may be excluded from consideration, since the minimum packet size for a Teredo Router Solicitation message is 48 bytes.

Also, in some embodiments, the TMC may need to examine additional network packets until an initial indication may be determined. Accordingly, more packets may be obtained and initial recognition may be attempted.

At block 608, in at least one of the various embodiments, the TMC may be arranged to perform one or more further actions to attempt to confirm the identity of the protocol. In at least one of the various embodiments, initial recognition that the packet may be associated with a protocol of interest may signal the TMC to perform further steps to determine if a protocol of interest is actually being used. In at least one of the various embodiments, the initial recognition steps may generate false positives unless further steps are performed to confirm or exclude the determination of the protocol.

Similar, to the initial recognition steps described above, there may be one or more different programs that may be executed to identify one or more different protocols. In at least one of the various embodiments, the values determined by the initial recognizers may drive which additional steps may be performed.

In some embodiments, the different steps may depend on one or more values determined during execution of the initial recognition steps of block 604. For example, if the first byte of the payload is a 1, there is a chance that the network flow may be associated with the Teredo protocol. Accordingly, in this example, in at least one of the various embodiments, the TMC may then perform one or more actions for confirming if the network flow may be using the Teredo protocol.

At decision block 610, in at least one of the various embodiments, if the protocol used by the network flow is confirmed, control may flow to block 612; otherwise, control may loop back to block 602. Note, in some embodiments, the TMC may be arranged to confirm that the network is not using a protocol of interest and continue to block 612. In at least one of the various embodiments, confirming the protocol may also include, associating the tuple of the network flow with the determined protocol. Accordingly, the TMC may tag the network flow by storing information in a data store or lookup table that associates the tuple of the flow with the determined protocol (or absence of a determined protocol). Thus, in at least one of the various embodiments, the TMC may avoid performing the actions for block 604-610 for subsequent network traffic for the same flow.

At block 612, in at least one of the various embodiments, since the protocol is identified, the TMC may be arranged to apply one or more network policies to the flow. Accordingly, an application, such as, policy engine 320 may be arranged to execute one or more policies to determine how to manage the network traffic that is associated with the network flow. Next, control may be returned to a calling process.

Figure 7:
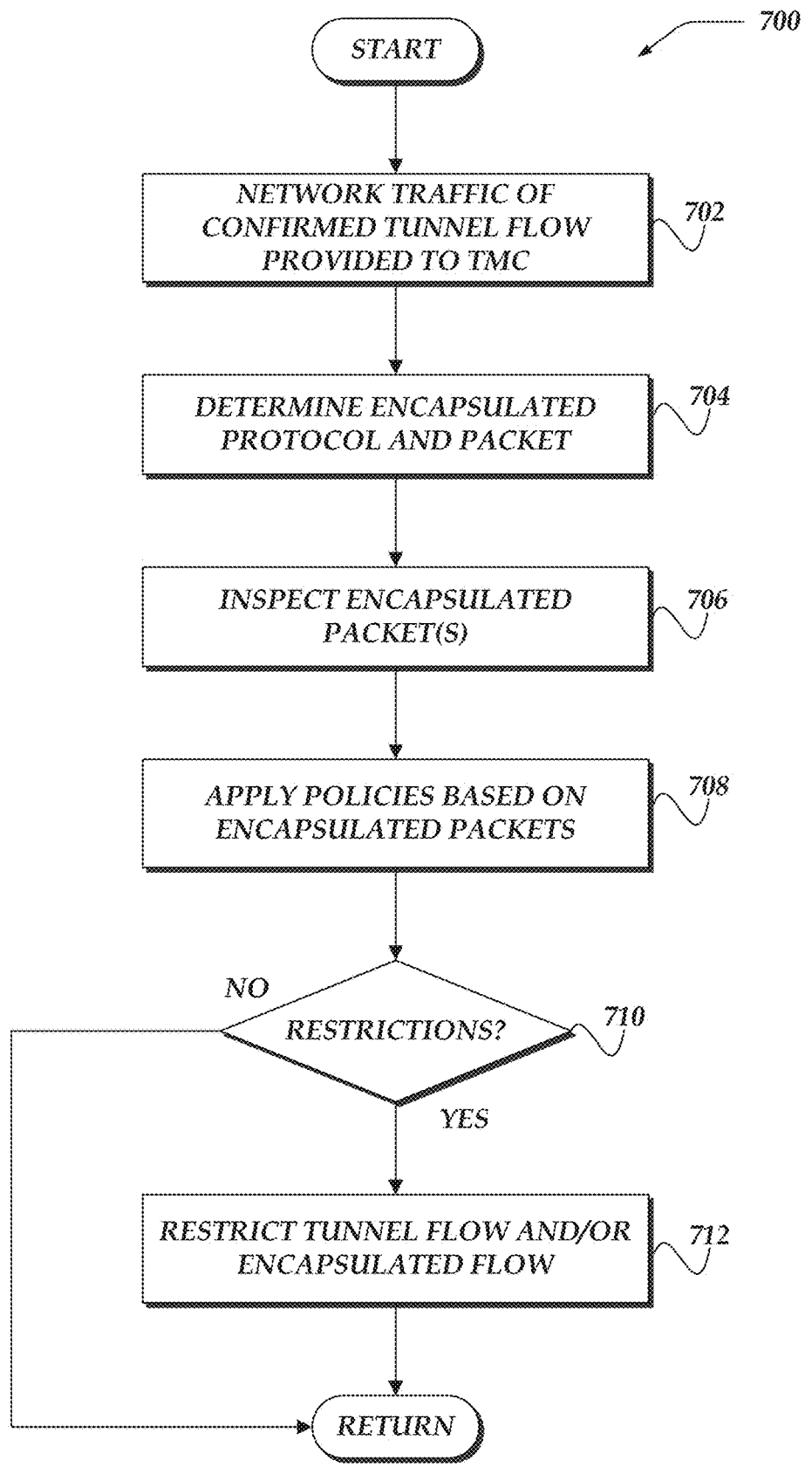
FIG. 7 shows an overview flowchart for a process for analysis the contents of a tunneling protocol in accordance with at least one of the various embodiments.

FIG. 7 shows an overview flowchart for process 700 for analysis the contents of a tunneling protocol in accordance with at least one of the various embodiments. After a start block, at block 702, in at least one of the various embodiments, network traffic of a confirmed tunneling protocol flow may be provided to a TMC. In at least one of the various embodiments, the TMC may confirm the protocol of the flow by looking up its protocol information using the tuple that may be associated with the network flow. Accordingly, in at least one of the various embodiments, the TMC may determine if the flow is using a tunneling protocol.

At block 704, in at least one of the various embodiments, the TMC may inspect the payload of the tunnel flow's network traffic to determine the protocol that is being encapsulated by the tunneling protocol. In at least one of the various embodiments, steps similar to process 600 may be performed if necessary. In other embodiments, some encapsulated protocol may be easily identified with simple pattern matching.

In at least one of the various embodiments, depending on the tunneling protocol, the TMC may have to execute one or more programs to isolate the encapsulated packet from the tunnel flow. Accordingly, one or more steps, such as, described for process 600 may be performed. For example, in some embodiments, the TMC may be arranged to compute an offset value into the tunnel packet to identify the start and/or end of the encapsulated packet.

At block 706, in at least one of the various embodiments, the TMC may be arranged to inspect the encapsulated packet. For example, the encapsulate packet may include source/destination addresses, ports, application identifiers, payload content, or so on. In at least one of the various embodiments, the inspection may be based on the details of the encapsulated protocol.

Accordingly, in at least one of the various embodiments, the TMC may have one or more different inspection routines that may be used to perform actions to inspect the encapsulated packet. In at least one of the various embodiments, the TMC may be arranged to use configuration information (e.g., policy rules) that map different encapsulated protocols to the programs, routines, or policy rules of the TMC that may perform one or more of the inspection actions.

At block 708, in at least one of the various embodiments, the TMC may be arranged to apply one or more network policies comprised of one or more policy rules based on the encapsulated packets. In at least one of the various embodiments, the restrictions associated with policies applied to the tunnel network flow may conflict with one or more of the policies applied to the network protocol of the encapsulated network flow. Accordingly, if the tunneling protocol has restrictions associated with it, the policies associated with the encapsulated protocol may be restricted by the restrictions associated with the tunneling protocol. For example, the tunneling protocol may be restricted to a certain list of IP addresses. Thus, in this example, if the encapsulated data packet has a destination address that is restricted from receiving tunneling protocol flows, the encapsulated packets may be discarded or otherwise disabled from communicating with the destination address included in the encapsulate packet. In some embodiments, this may prevent encapsulated network traffic from bypassing traffic management policies that may be applicable to the tunneling protocol flows that it is encapsulated within.

Likewise, if the TMC restricts the applications/services that are associated with the encapsulated packet, the TMC may apply those restrictions to the tunneling protocol flow. For example, if a user attempts to use a tunneling protocol to access a restricted website, the TMC may discover the encapsulated protocol (HTTP in this case) and apply its HTTP outbound policies to the tunnel flow to restrict the user from accessing the restricted website via encapsulated HTTP.

At decision block 710, in at least one of the various embodiments, as described in part above, if one or more restrictions should be applied, control may flow to block 712; otherwise, control may be returned to a calling process. In this case, the restrictions may be provided by policy rules that may be associated with the tunneling protocol or the encapsulated protocol, or both.

At block 712, in at least one of the various embodiments, the TMC may be arranged to restrict the tunneling network flow traffic or the encapsulated network traffic. In most cases, the tunneling flow packets may be restricted. For example, in at least one of the various embodiments, if the encapsulated network flow is violating a policy associated with the encapsulated protocol, the tunneling network flow packets may be discarded. In some embodiments, other restrictions may be applied, such as, enhanced logging, enhanced packet inspections, rate limiting, or the like, or combination thereof, as determined by the policy rules associated with the policy that may be being violated.

In at least one of the various embodiments, the tunneling flow may be used by more than one endpoint computer. For example, more than one client computer may be sharing the same tunneling flow. Accordingly, endpoint tunnel server/client applications, such as, tunneling client/server application 220 and/or tunneling client/server application 321 may be arranged to multiplex more than one user and/or computer over the same tunneling network flow. Accordingly, in some embodiments, applying a restriction to the entire tunneling flow because of policy violations made by one or a few of encapsulated tenant flows may unnecessarily disrupt the communication of well-behaved users/computers. Thus, in one or more of the various embodiments, the TMC may be arranged to apply different policies to portions of the tunneled network traffic depending on the endpoints, applications, or the like, associated with encapsulated traffic. Next, control may be returned to calling process.

Figure 8:
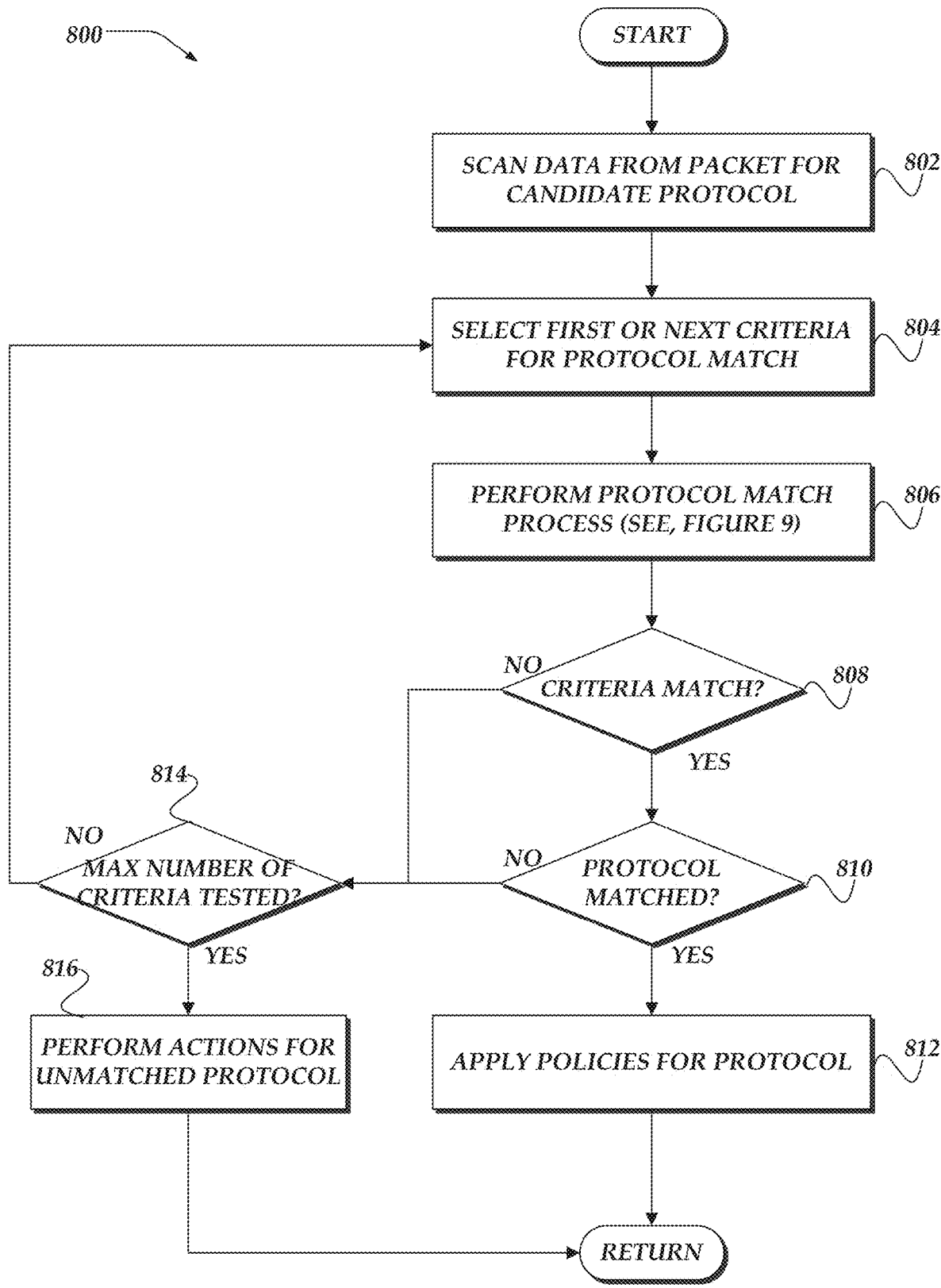
FIG. 8 shows an overview flowchart for a process for inspection of network packets to identify the complex protocols in accordance with at least one of the various embodiments.

FIG. 8 shows an overview flowchart for process 800 for inspection of network packets to identify the complex protocols in accordance with at least one of the various embodiments. After a start block, at block 802, in at least one of the various embodiments, the TMC may be arranged to scan the content of one or more network packets for a provide network flow. In at least one of the various embodiments, previously, the TMC may have employed the tuple information that is associated with the network flow to determine if the protocol information is already determined. Accordingly, in at least one of the various embodiments, the actions of process 800 may be required if the network protocol used by the network flow remains undetermined or unconfirmed.

In at least one of the various embodiments, a protocol may be recognized with less or more certainty by matching fewer or more criteria. The level of certainty required to justify applying a traffic management policy, such as, restricting a flow may be varied depending on the relative performance costs associated with TMC related to processing and recovering from actions taken in error. In some embodiments, the number of criteria required to be matched on one occasion or another may be determined independently from the definition of the various criteria. However, the available criteria may be ordered so that choosing the number of criteria required to be matched to consider a protocol matched controls the amount of processing effort and the degree of accuracy at the same time. In at least one of the various embodiments, both the number of criteria required to be matched to recognize a protocol and the maximum number of criteria to be tested may be specified. The number of required criteria may not exceed the number to be tested. In some embodiments, the TMC or its policy engine may be arranged to unroll the logical loop shown in this flowchart to express it as a decision tree or graph with or without cycles.

At block 804, in at least one of the various embodiments, the next (set of) criteria used to attempt to recognize the protocol may be selected. In some embodiments, if block 804 is first reached for a candidate protocol the next criteria may be simply the first criteria.

At block 806, in at least one of the various embodiments, the protocol matching process may be executed. In at least one of the various embodiments, the one or more criteria for matching complex protocols, such as the some tunneling protocols (e.g., Teredo protocol), may require one or more steps that may each have one or more different parameters, operands, and/or requirements. Accordingly, the TMC may be arranged to invoke one or more processes to perform the actions to test for a given criteria.

At decision block 808, in at least one of the various embodiments, if the selected criteria produces a match indication, control may flow to decision block 808; otherwise, control may flow to decision block 814.

At decision block 810, in at least one of the various embodiments, if the protocol is matched control may flow to block 812; otherwise, control may flow to decision block 814. Here, in some embodiments, a protocol may be considered matched if a sufficient number of the selected criteria are matched to enable the protocol to be confirmed.

At block 812, in at least one of the various embodiments, one or more network traffic management policies may be applied. In at least one of the various embodiments, since the identify of network protocol used by the network flow is confirmed, the TMC may apply one or more or policies that may be configured for the identified network protocol. Next, control may be returned to a calling process.

At decision block 814, in at least one of the various embodiments, if the maximum number of criteria have been considered, control may flow to block 816; otherwise, control may loop back to block 804. In at least one of the various embodiments, if the selected set of criteria is exhausted absent a protocol match, the protocol may be considered unmatched or unconfirmed.

At block 816, in at least one of the various embodiments, one or more configured actions may be performed to handle the unconfirmed protocol. In at least one of the various embodiments, the TMC may be configured with one or more policies for managing network flows that may be associated with unconfirmed network protocols. Other criteria such as tuple information may be considered for policy selection even though the type of network protocol may be unconfirmed. For example, such a policy may require network flows originating from a defined set of network addresses that are associated with unconfirmed protocols to be blocked or otherwise discarded. Next, control may be returned to a calling process.

Figure 9A:
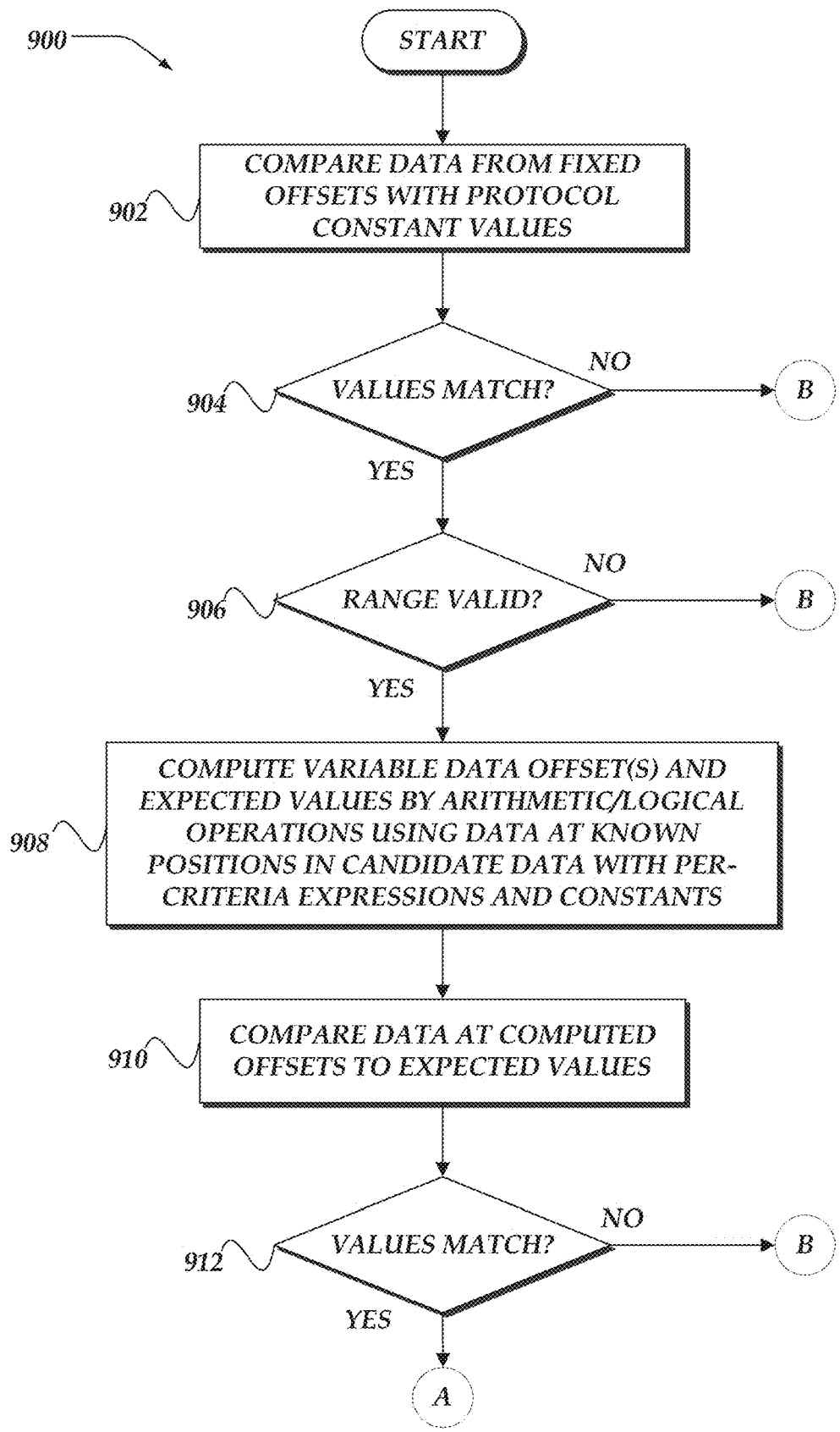
FIGS. 9A-9C shows an overview flowchart for a process for inspection of network packets to identify the complex protocols in accordance with at least one of the various embodiments.
Figure 9B:
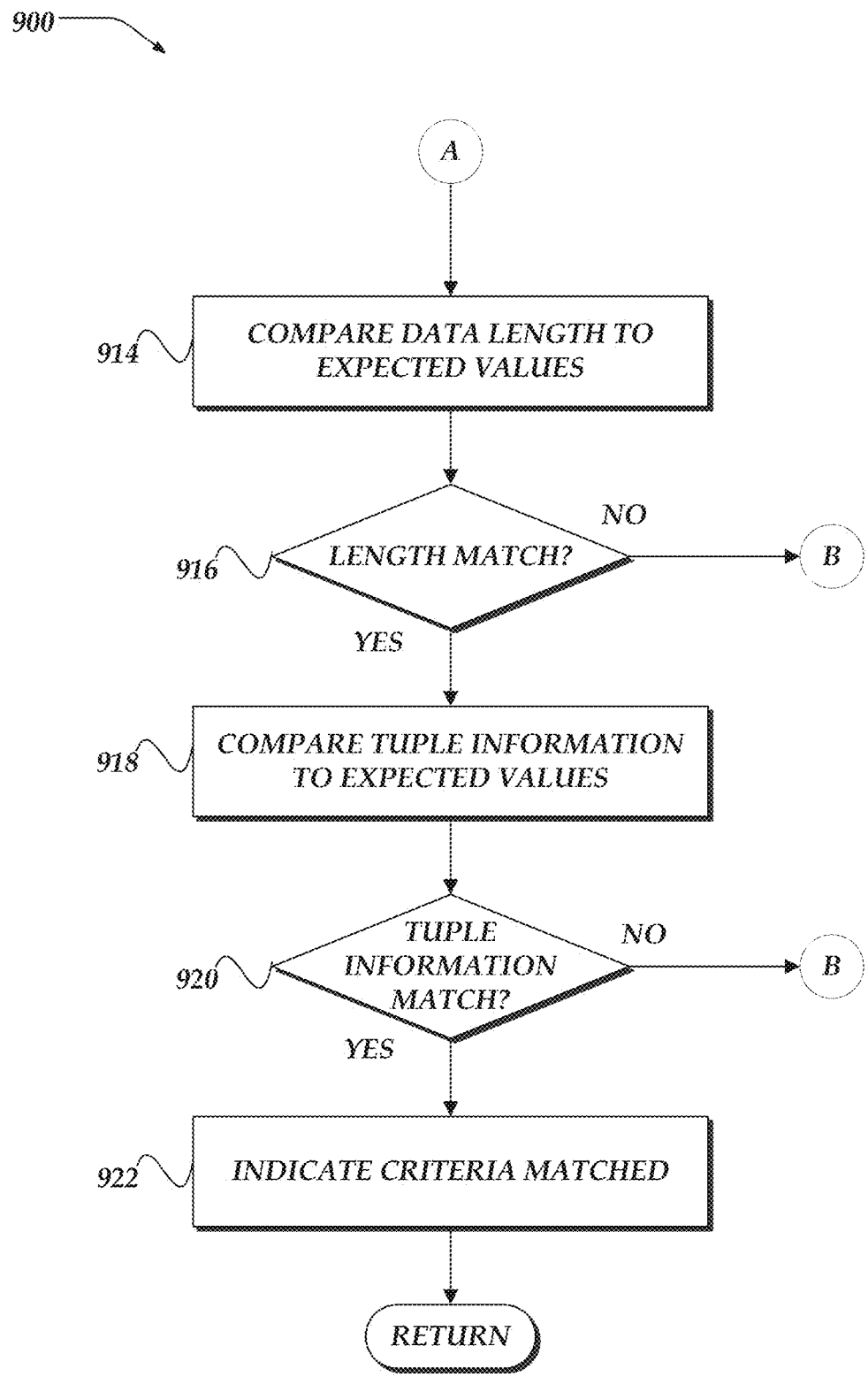
Figure 9C:
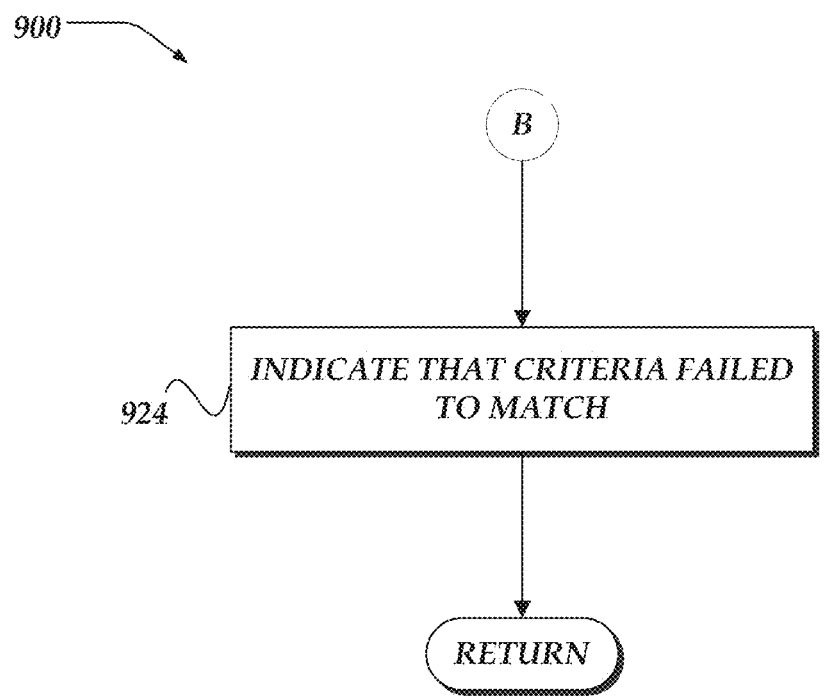

FIGS. 9A-9C show an overview flowchart for process 900 for inspection of network packets to identify the complex protocols in accordance with at least one of the various embodiments. After a start block, at block 902, in at least one of the various embodiments, compare data extracted from one or more fixed offsets within the network packets with one or more protocol constant values. For example, for Teredo protocol, the first byte of the encapsulated packet should be a 1 (0x01). These data values may be selected and included in constant value recognizer steps because they can be quickly tested using arithmetic or logical operations. In some embodiments, a TMC may be arranged such that the constant value recognizers steps tests may be performed on a DFS, such as, DFS 338. Likewise, other optimized hardware components, such as FPGAs, ASIC, PALs, or the like, may be arranged to perform one or more of the constant value recognizer steps.

At decision block 904, in at least one of the various embodiments, if the values obtained by a constant value recognizer step, match the values required for a given protocol, control may flow to decision block 906; otherwise, control may flow to block 924 in FIG. 9C. In at least one of the various embodiments, the constant recognizer steps enable the TMC to quickly exclude network flows that do not have the expected values at the fixed position required for a given protocol of interest.

At decision block 906, in at least one of the various embodiments, if the range of the values and/or the size of the network packet is in a valid range for the protocol, control may flow to block 908; otherwise, control may flow to block 924 in FIG. 9C. In at least one of the various embodiments, the packet size information may vary depending on the protocol of interest. Accordingly, the values used for comparison may be provided using configuration information, policy rules and/or embedded in an FPGA, ASIC, DFS, or the like.

At block 908, in at least one of the various embodiments, variable data offset(s) and expected values may be computed by arithmetic/logical operations using data at known positions in candidate protocol data with per-criteria expressions and constants.

In at least one of the various embodiments, the TMC may generate an offset value into the packet data may be based on the scanned data values and one or more constants that are associated with the protocol of interest. In at least one of the various embodiments, the offset value may be computed from values read from the packet. Accordingly, the offset value may be indeterminable using simple pattern matching. For example, a regular expression ran against the contents of the packets would be unable to determine the correct offset value since the offset value is computed from other values and constants associated with the protocol included in the packets under inspection by the TMC.

In at least one of the various embodiments, the criteria currently selected for matching may include expressions which define the immediate values of variable data offsets and expected data values by arithmetic and/or logical operations which use data from fixed or computed positions in the packet data and protocol-specific constants. For example, the criteria might include expressions which compute the sum of values at one or more positions in the packet. That sum might then be the expected value at another position in the packet. The criteria may also include expressions to compute expected values of the packet length and/or one or more elements of packet tuple information.

At block 910, in at least one of the various embodiments, data from the packets located at the computed offsets may be compared to values that may be expected or required for a given protocol criteria. In at least one of the various embodiments, since an offset has been determined, the packet size may be further confirmed. For example, for the Teredo protocol, if the length of the packet is less than the minimum packet size plus a particular offset value, the protocol is not Teredo.

In at least one of the various embodiments, one or more values at determined offsets in the network packet may be compared to one or more calculated values that may be associated with a particular protocol. Further, in at least one of the various embodiments, the TMC may be arranged perform one or more computations as part of the comparison actions.

In at least one of the various embodiments, the amount of data and the positions scanned within the packet may vary depending on the particular protocol of interest. As discussed above, scanning instructions for a particular protocol may be defined using one or more programming languages, scripts, configuration information, policy rules, or the like, or combination thereof. Also, in at least one of the various embodiments, the scanning instructions may be embedded in one or more FPGAs, ASICs, DFSs, or the like.

At decision 912, in at least one of the various embodiments, if the values at the computed offsets match the criteria values, control may flow to block 914 (in FIG. 9B); otherwise, control may flow to block 924 in FIG. 9C.

FIG. 9B shows an overview flowchart for a continuation of process 900 for inspection of network packets to identify the complex protocols in accordance with at least one of the various embodiments.

At block 914, in at least one of the various embodiments, the packet length associated with the data may be compared to the expected packet length for the candidate protocol. For example, if the TMC may be performing actions to determine if the complex protocol is the Teredo protocol, and the determined payload size of the packet is less than 48 bytes control may be returned to a calling process. In at least one of the various embodiments, the payload size may be tested with or without the headers of the protocol (e.g., UDP, TCP/IP) that may be used to deliver or encapsulate the packet as long that the threshold value used for the comparison accounts for the size of the headers.

In at least one of the various embodiments, if the packet size exceeds a known threshold value, the protocol currently under consideration may be excluded. Accordingly, further actions do not need to be performed for this network packet. Note, in at least one of the various embodiments, there may be additional recognition actions that may be performed to confirm/identify other complex protocols.

In at least one of the various embodiments, if the packet size is within a defined range, the minimum requirement may be considered met. Thus, in some embodiments, further actions may be performed to confirm the identify the protocol.

At decision block 916, in at least one of the various embodiments, if the length/size of the packet matches the criteria, control may flow to block 918; otherwise, control may flow to block 924 in FIG. 9C.

At block 918, in at least one of the various embodiments, the tuple information associated with the network traffic data may be compared to values expected by the criteria. In one or more of the various embodiments, tuple information such as ports, addresses, addresses ranges, or the like, may be required to match particular values for a given complex protocol. For example, the standard port for Teredo protocol is UDP port 3544. Thus, for example, if the network traffic being inspected is using the Teredo protocol it may be using UPD port 3544. Likewise, other complex protocols may be commonly associated with particular ports, addresses, address ranges, or the like.

At decision block 920, in at least one of the various embodiments, if the tuple information matches the values associated with the criteria, control may flow to block 922; otherwise, control may flow to block 924 in FIG. 9C.

At block 922, in at least one of the various embodiments, an indication the criteria was satisfied may be provided. In at least one of the various embodiments, if the network protocol is identified, the protocol may be associated with the tuple information of the network flow. Thus, the protocol may be identified immediately for subsequent network packets that may be provided over the same network flow. Next, control may be returned to a calling process.

FIG. 9C shows a flowchart for a continuation of process 900 for inspection of network packets to identify the complex protocols in accordance with at least one of the various embodiments. At block 924, in at least one of the various embodiments, since the criteria did not produce a match, an indication the criteria did not match may be provided. Next, control may be returned to a calling process.

In some embodiments, process 900 may be arranged to postpone evaluating an expression to define the expected values of the packet length until immediately before testing whether the length matches. Likewise, in at least one of the various embodiments, the order of criteria evaluation may vary depending on the criteria being tested.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing examples should not be construed as limiting and/or exhaustive, but rather, an illustrative use case to show an implementation of at least one of the various embodiments of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions as a System On a Chip (SOC), or the like.

What is claimed as new and desired to be protected by Letters Patent of the United States is:

1. A method for managing network communication, executable by one or more traffic management computers with one or more processors executing the method, the method comprising actions to:
    receiving, by a first processor on the one or more traffic management computers, network traffic; and
    when a network protocol associated with the network traffic is unknown, performing, by a second processor on the one or more traffic management computers further operations, including:
        providing one or more constant value recognition actions, wherein one or more of the constant value recognition actions correspond to one or more complex protocols;
        when a constant value recognition condition is satisfied, perform, by a third processor on the one or more traffic management computers further operations, including:
            determining one or more variable offsets for packets in a network flow based on employing one or more regular expressions to compute immediate offset values of one or more known positions for one or more constant offset values associated with the one or more complex protocols and employing one or more other regular expressions to compute a sum of the immediate offset values of the one or more known positions and compare the sum to one or more expected offset values at one or more other positions in the packets;
            scanning one or more portions of data from the network traffic, wherein the one or more portions of the data correspond to the one or more variable offsets of the one or more complex protocols;
            providing one or more values that are based on the one or more portions of the data and one or more constants associated with the one or more complex protocols; and
            performing one or more comparisons based on the one or more values and the one or more complex protocols; and
        when a count of the one or more comparisons that are affirmative exceeds a threshold value, performing, by a fourth processor on the one or more traffic management computers, one or more operations on the network traffic based on one or more policy rules that are associated with the one or more complex protocols; and
        when the count of the one or more comparisons that are affirmative is less than the threshold value, perform, by the fourth processor on the one or more traffic management computers, one or more operations on the network traffic based on one or more other policy rules that are associated with the one or more complex protocols that are non-confirmed because the count of affirmative comparisons is less than the threshold value.

2. The method set forth in claim 1, wherein the first processor, the second processor, third processor, and the fourth processor are all provisioned on one of the one or more processors.

3. The method set forth in claim 1, wherein at least one of the first processor, the second processor, third processor, or the fourth processor are all provisioned by the one or more processors with the same traffic management computer.

4. The method set forth in claim 1, wherein the one or more constant value recognition actions, further comprise, comparing a packet size of one or more packets in the network traffic to a maximum packet size that corresponds to the one or more complex protocols.

5. The method set forth in claim 1, wherein performing the one or more operations on the network traffic, further comprises:
    providing an identity of another network protocol that is encapsulated in the complex protocol; and
    performing one or more other operations on the network traffic based on the identity of the encapsulated network protocol.

6. The method set forth in claim 1, wherein the one or more complex protocols is one of a Teredo protocol, or a tunneling protocol.

7. One or more traffic management computers comprising:
- memory comprising programmed instructions stored in the memory; and
- one or more processors configured to execute the programmed instructions stored in the memory to perform actions, comprising:
- receiving network traffic; and
- when a network protocol associated with the network traffic is unknown, performing further operations, including:
  - providing one or more constant value recognition actions, wherein the one or more constant value recognition actions correspond to one or more complex protocols;
  - when a constant value recognition condition is satisfied, perform, by a third processor on the one or more traffic management computers further operations, including:
    - determining one or more variable offsets for packets in a network flow based on employing one or more regular expressions to compute immediate values of one or more known positions for one or more constant values associated with the one or more complex protocols and employing one or more other regular expressions to compute a sum of the immediate values of the one or more known positions and compare the sum to one or more expected values at one or more other positions in the packets;
    - scanning one or more portions of data from the network traffic, wherein the one or more portions of the data correspond to the one or more variable offsets of the one or more complex protocols;
    - providing one or more values that are based on the one or more portions of the data and one or more constants defined by the one or more complex protocols; and
    - performing one or more comparisons based on the one or more values and the one or more complex protocols; and
  - when a count of the one or more comparisons that are affirmative exceeds a threshold value, performing one or more operations on the network traffic based on one or more policy rules that are associated with the one or more complex protocols; and
  - when the count of the one or more comparisons that are affirmative is less than the threshold value, perform, by the fourth processor on the one or more traffic management computers, one or more operations on the network traffic based on one or more other policy rules that are associated with the one or more complex protocols that are non-confirmed because the count of affirmative comparisons is less than the threshold value.

8. The one or more traffic management computers set forth in claim 7, wherein the first processor, the second processor, third processor, and the fourth processor are all provisioned on one of the one or more processors.

9. The one or more traffic management computers set forth in claim 7, wherein at least one of the first processor, the second processor, third processor, or the fourth processor are all provisioned by the one or more processors with the same traffic management computer.

10. The one or more traffic management computers set forth in claim 7, wherein the one or more constant value recognition actions, further comprise, comparing a packet size of one or more packets in the network traffic to a maximum packet size that corresponds to the one or more complex protocols.

11. The one or more traffic management computers set forth in claim 7, wherein performing the one or more actions on the network traffic, further comprises:
- providing an identity of another network protocol that is encapsulated in the complex protocol; and
- performing one or more other operations on the network traffic based on the identity of the encapsulated network protocol.

12. The one or more traffic management computers set forth in claim 7, wherein the one or more complex protocols is one of a Teredo protocol, or a tunneling protocol.

13. A processor readable non-transitory storage media that includes instructions for managing network communications, wherein execution of the instructions by one or more processors in one or more traffic management computers perform actions comprising:
- receiving, by a first processor on the one or more traffic management computers, network traffic; and
- when a network protocol associated with the network traffic is unknown, performing, by a second processor on the one or more traffic management computers further operations, including:
  - providing one or more constant value recognition actions, wherein the one or more constant value recognition actions correspond to one or more complex protocols;
  - when a constant value recognition condition is satisfied, perform, by a third processor on the one or more traffic management computers further operations, including:
    - determining one or more variable offsets for packets in a network flow based on employing one or more regular expressions to compute immediate values of one or more known positions for one or more constant values associated with the one or more complex protocols and employing one or more other regular expressions to compute a sum of the immediate values of the one or more known positions and compare the sum to one or more expected values at one or more other positions in the packets;
    - scanning one or more portions of data from the network traffic, wherein the one or more portions of the data correspond to the one or more variable offsets of the one or more complex protocols;
    - providing one or more values that are based on the one or more portions of data and one or more constants defined by the one or more complex protocols; and
    - performing one or more comparisons based on the one or more values and the one or more complex protocols; and
  - when a count of the one or more comparisons that are affirmative exceeds a threshold value, perform, by a fourth processor on the one or more traffic management computers, one or more operations on the network traffic based on the one or more complex protocols; and
  - when the count of the one or more comparisons that are affirmative is less than the threshold value, perform, by the fourth processor on the one or more traffic management computers, one or more operations on the network traffic based on one or more other policy rules that are associated with the one or more complex protocols that are non-confirmed because the count of affirmative comparisons is less than the threshold value.

14. The processor readable non-storage media set forth in claim 13, wherein the first processor, the second processor, third processor, or the fourth processor are all provisioned on one of the one or more processors.

15. The processor readable non-storage media set forth in claim 13, wherein at least one of the first processor, the second processor, third processor, or the fourth processor are all provisioned by the one or more processors with the same traffic management computer.

16. The processor readable non-storage media set forth in claim 13, wherein the one or more constant value recognition actions, further comprises, comparing a packet size of one or more packets of the network traffic to a maximum packet size that corresponds to the one or more complex protocols.

17. The processor readable non-storage media set forth in claim 13, wherein performing the one or more operations on the network traffic, further comprises:
   providing an identity of another network protocol that is encapsulated in the complex protocol; and
   performing one or more other operations on the network traffic based on the identity of the encapsulated network protocol.

18. The processor readable non-storage media set forth in claim 13, wherein the one or more complex protocols is one of a Teredo protocol, or a tunneling protocol.

19. A system for managing network traffic comprising:
   one or more traffic management computers comprising:
      memory comprising programmed instructions stored in the memory; and
      one or more processors configured to execute the programmed instructions stored in the memory to perform actions, comprising:
         receiving network traffic; and
         when a network protocol associated with the network traffic is unknown, performing further operations, including:
            providing one or more constant value recognition actions, wherein the one or more constant value recognition actions correspond to one or more complex protocols;
            when a constant value recognition condition is satisfied, perform, by a third processor on the one or more traffic management computers further operations, including:
               determining one or more variable offsets for packets in a network flow based on employing one or more regular expressions to compute immediate values of one or more known positions for one or more constant values associated with the one or more complex protocols and employing one or more other regular expressions to compute a sum of the immediate values of the one or more known positions and compare the sum to one or more expected values at one or more other positions in the packets;
               scanning one or more portions of data from the network traffic, wherein the one or more portions of the data correspond to the one or more variable offsets of the one or more complex protocols;
               providing one or more values that are based on the one or more portions of the data and one or more constants defined by the one or more complex protocols; and
               performing one or more comparisons based on the one or more values and the one or more complex protocols; and
            when a count of the one or more comparisons that are affirmative exceeds a threshold value, performing one or more operations on the network traffic based on one or more policy rules that are associated with the one or more complex protocols; and
            when the count of the one or more comparisons that are affirmative is less than the threshold value, performing, by the fourth processor on the one or more traffic management computers, one or more operations on the network traffic based on one or more other policy rules that are associated with the one or more complex protocols that are non-confirmed because the count of affirmative comparisons is less than the threshold value; and
   a client computer, comprising:
      a client computer transceiver that communicates over the network;
      a client computer memory that stores at least instructions; and
      one or more processor devices that execute instructions that perform actions, including:
         providing one or more portions of the network traffic.

20. The system set forth in claim 19, wherein the one or more constant value recognition actions, further comprise, comparing a packet size of one or more packets in the network traffic to a maximum packet size that corresponds to the one or more complex protocols.

21. The system set forth in claim 19, wherein performing the one or more actions on the network traffic, further comprises:
   providing an identity of another network protocol that is encapsulated in the complex protocol; and
   performing one or more other operations on the network traffic based on the identity of the encapsulated network protocol.

22. The system set forth in claim 19, wherein the one or more complex protocols is one of a Teredo protocol, or a tunneling protocol.

* * * * *